(12) United States Patent
Xie et al.

(10) Patent No.: US 12,418,491 B2
(45) Date of Patent: Sep. 16, 2025

(54) METHOD AND APPARATUS FOR PROCESSING DATA STREAMS, COMPUTING DEVICE AND STORAGE MEDIUM

(71) Applicant: Beijing Tusen Zhitu Technology Co., Ltd., Beijing (CN)

(72) Inventors: Mutong Xie, Beijing (CN); Qingyu Sui, Beijing (CN)

(73) Assignee: Beijing Tusen Zhitu Technology Co., Ltd., Beijing (CN)

( * ) Notice: Subject to any disclaimer, the term of this patent is extended or adjusted under 35 U.S.C. 154(b) by 663 days.

(21) Appl. No.: 17/662,419

(22) Filed: May 6, 2022

(65) Prior Publication Data
US 2022/0360538 A1 Nov. 10, 2022

(30) Foreign Application Priority Data
May 7, 2021 (CN) .......................... 202110495101.0

(51) Int. Cl.
*H04L 47/28* (2022.01)
*H04L 49/90* (2022.01)
*H04L 67/12* (2022.01)

(52) U.S. Cl.
CPC .............. *H04L 47/28* (2013.01); *H04L 49/90* (2013.01); *H04L 67/12* (2013.01)

(58) Field of Classification Search
CPC ....... H04L 43/106; H04L 47/28; H04L 49/90; H04L 67/12; H04L 67/565; H04L 69/28
See application file for complete search history.

(56) References Cited

U.S. PATENT DOCUMENTS

| 2010/0183034 A1* | 7/2010 | Kroepfl ................... H04L 67/12 370/503 |
| 2012/0324520 A1 | 12/2012 | Van Deventer et al. |

(Continued)

FOREIGN PATENT DOCUMENTS

| CN | 111970351 A | 11/2020 |
| CN | 112135177 A | 12/2020 |

OTHER PUBLICATIONS

European Patent Office, Communication pursuant to Article 94(3) EPC for EP Application No. 22166903.9, mailed Oct. 12, 2023, 6 pages.

(Continued)

*Primary Examiner* — Ayman A Abaza
*Assistant Examiner* — Hooman Houshmand
(74) *Attorney, Agent, or Firm* — Perkins Coie LLP

(57) ABSTRACT

The present disclosure relates to a method and apparatus for processing sensor data, a computing device and a storage medium, which are used to solve the problem of inconsistency in sensor data streams transmitted to an algorithm module in the prior art. The method for processing the sensor data comprises: receiving a plurality of data streams to be processed, each data stream corresponding to a sensor, and each data stream comprising a data frame having a generation timestamp; correcting the generation timestamps of the data frames to acquire corrected timestamps; and determining, based on the corrected timestamps of the data frames and preset data transmission periods, a data frame to be transmitted in each data transmission period for each data stream.

20 Claims, 9 Drawing Sheets

(56) References Cited

U.S. PATENT DOCUMENTS

2017/0163411 A1      6/2017   Van Den Berghe
2020/0153527 A1      5/2020   Matsunaga et al.
2020/0327371 A1*    10/2020   Sharma ................... H04L 67/34
2021/0129842 A1*     5/2021   Wang ...................... H04L 67/12

OTHER PUBLICATIONS

European Patent Office, Extended European Search Report for EP Application No. 22166903.9, mailed Sep. 14, 2022, 9 pages.
United Arab Emirates, Ministry of Economy, Substantive Examination Result for UAE Appl. No. P6000816/2022, mailed on Oct. 10, 2024, 8 pages.

* cited by examiner

METHOD AND APPARATUS FOR PROCESSING DATA STREAMS, COMPUTING DEVICE AND STORAGE MEDIUM

CROSS-REFERENCE TO RELATED APPLICATION(S)

The present disclosure claims priority to Chinese Patent Application No. 202110495101.0, titled "METHOD AND APPARATUS FOR PROCESSING SENSOR DATA, COMPUTING DEVICE AND STORAGE MEDIUM", filed on May 7, 2021, the content of which is incorporated herein by reference in its entirety.

TECHNICAL FIELD

The present disclosure relates to the field of computer technologies, and more particularly, to a method and apparatus for processing sensor data, a computing device and a storage medium.

BACKGROUND

In an autonomous driving system, multi-sensor fusion is an essential part of the algorithm process. These sensors include, but are not limited to: a satellite positioning system, an inertial measuring units, an image sensor, a LIDAR sensor, a millimeter-wave radar sensor, etc. A multi-sensor fusion algorithm usually requires that the incoming data combination is generated at the same time and/or after post-processing of data generated at the same time, in order to achieve the best algorithm effect. However, in practical applications, due to the inconsistent and unpredictable delays of different sensors, such as an exposure time of the image sensor, a scanning time of the LIDAR sensor during one rotation, a data transmission time between the sensor and a server, etc., it is necessary to provide a solution that can align a plurality of different input data streams.

SUMMARY

The present application provides a method and apparatus for processing sensor data, a computing device, a storage medium and a vehicle, which can align a plurality of sensor data streams and improve the accuracy of subsequent algorithm module calculations.

A first aspect of the present application provides a method for processing the sensor data, comprising: receiving a plurality of data streams to be processed, each data stream corresponding to one sensor, and a data frame in each data stream having a generation timestamp; correcting the generation timestamp of the respective data frame to acquire a corrected timestamp; and determining, based on the corrected timestamps of the respective data frames and preset data transmission period, the data frame to be transmitted in each data transmission period for each data stream.

A second aspect of the present application provides an apparatus for processing sensor data. The apparatus comprises: a data frame receiving module configured to receive a plurality of data streams to be processed, each data stream corresponding to one sensor, and a data frame in each data stream having a generation timestamp; a timestamp correcting module configured to correct the generation timestamp of the respective data frame to acquire a corrected timestamp; and a data frame aligning module configured to determine, based on the corrected timestamps of the respective data frames and preset data transmission period, the data frame to be transmitted in each data transmission period for each data stream.

A third aspect of the present application provides a computing device. The computing device comprises: one or more processors; and a memory configured to store instructions therein, wherein the instructions, when executed by the one or more processors, cause the one or more processors to implement the method for processing the sensor data in the present application.

A fourth aspect of the present application provides a computer-readable storage medium configured to store instructions therein, wherein the instructions, when executed by a processor, cause implementation of the method for processing the sensor data of the present application.

A fifth aspect of the present application provides a vehicle including the computing device as described above.

According to the technical solutions of the present application, in the case that different sensors have a certain time error, system scheduling influence, and delay caused by the calculation of a data stream processing program, etc., a plurality of data streams is aligned to the same trigger frame based on the generated timestamps of the respective received data streams, which ensures that data transmitted to an algorithm module is collected at the same time or obtained by post-processing the data collected at the same time, thereby improving the calculation accuracy of the algorithm module.

BRIEF DESCRIPTION OF THE DRAWINGS

To describe the embodiments of the present invention or the technical solutions in the prior art more clearly, the following briefly introduces the accompanying drawings required for describing the embodiments and the prior art. A person of ordinary skill in the art may still derive other drawings from these accompanying drawings without creative efforts.

DETAILED DESCRIPTION

Figure 1:
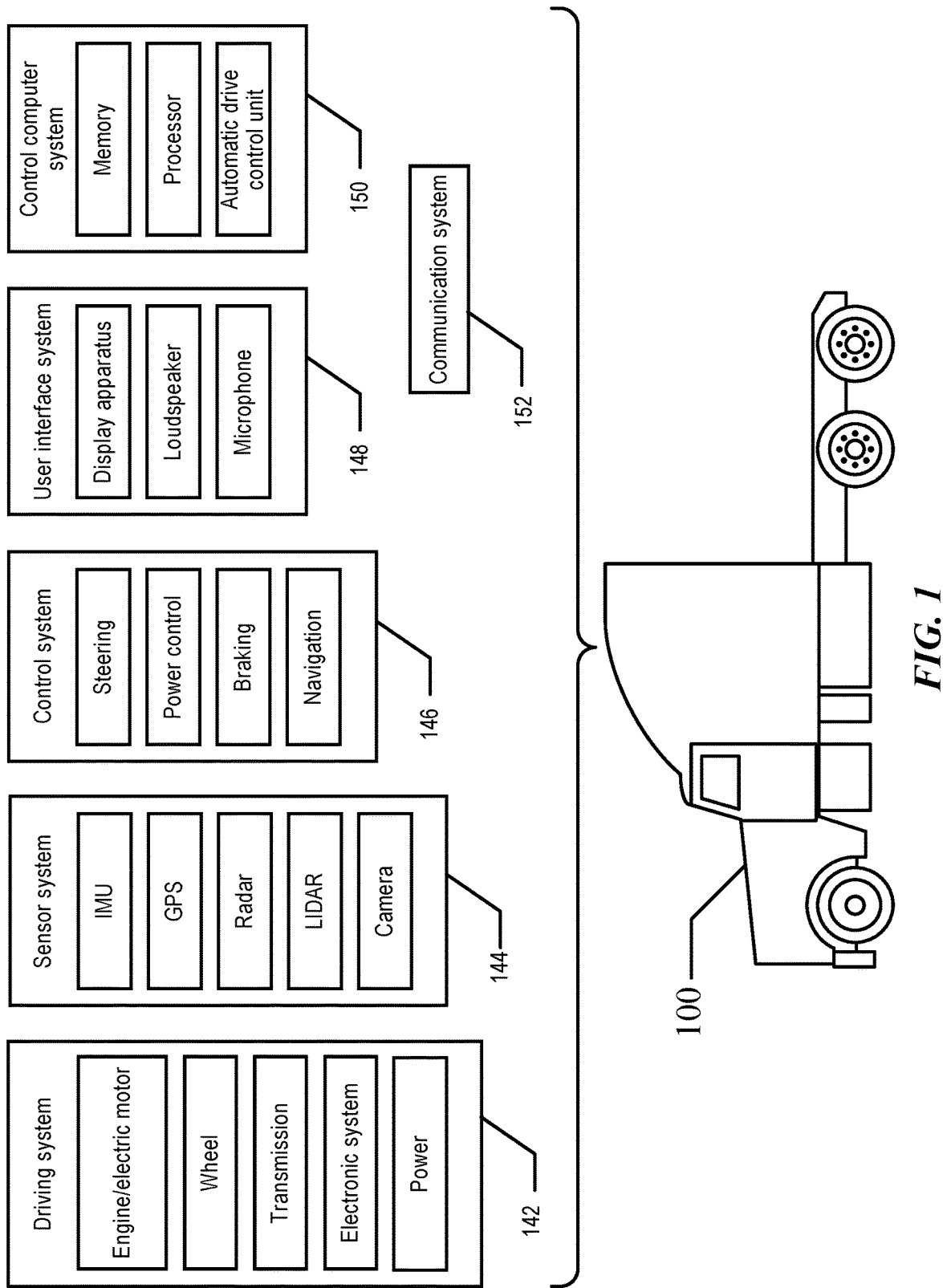
FIG. 1 is a structural diagram of a vehicle according to an exemplary embodiment of the present application.

The technical solutions in the embodiments of the present invention will be described clearly and completely below in conjunction with accompanying drawings. Of course, the described embodiments are merely some embodiments, rather than all embodiments, of the present invention. Based on the embodiments in this description, those of ordinary skill in the art can make various modifications and transformations, and all technical solutions obtained by transformations in an equivalent manner fall within the protection scope of the present invention.

In order to clearly describe the technical solutions in the embodiments of the present application, in the embodiments of the present application, terms such as "first" and "second" are used to distinguish the same items or similar items with basically the same function or effect. Those skilled in the art can understand that the terms such as "first" and "second" do not limit the quantity and execution order.

The term "and/or" herein describes the correspondence of the corresponding objects, indicating three kinds of relationship. For example, A and/or B, can be expressed as: A exists alone, A and B exist concurrently, and B exists alone. In addition, the character "/" generally indicates an "or" relationship between the contextual objects.

Embodiments of the present application relates to a method and apparatus for processing sensor data, a related computing device, a storage medium and a vehicle, which are used to align data generated at the same time, thereby ensuring the consistency in data transmitted to an algorithm module.

In order to make a person of ordinary skill in the art better understand the present disclosure, part of the technical terms that appear in the embodiments of the present disclosure will be explained as follows.

Sensor time: a clock source recorded in sensor hardware is usually synchronized with Wall Time (i.e., real time $t_{real\ time}$ or wall clock time) through satellite timing or other means, with an extremely small error therebetween.

Server time: a clock source recorded in server hardware may be acquired by software installed on the server hardware and usually synchronized with Wall Time (i.e., real $_{real\ time}$ or wall clock time) through satellite timing or other means, with an extremely small error therebetween. The sensor time may be considered equal to the server time.

Hard trigger sensor: a sensor time is synchronized with a certain clock source, with an extremely small error therebetween; the hard trigger sensor has fixed data generation frequencies (or trigger frequency), which are usually 50 Hz, 20 Hz, 10 Hz, etc., as equally divided within 1 second in practical applications; and it is a sensor that will generate data at the start of 1 second.

Sensor data: data generated by a sensor and acquired by a sensor driver on a server.

Sensor driver: it may acquire a generation timestamp of each frame of data in non-abnormal cases, wherein this timestamp has an extremely small error with an actual data generation time, whether it is to directly read a sensor signal to obtain the sensor time, directly acquire the server time, or obtain the timestamp by calculation/correction by some algorithm.

Data stream: a series of continuous, frame-based data.

Data stream processing: it comprises receiving an input data stream; processing each frame to generate a result; and generating a program of outputting a data stream by using this result as a new frame.

Data timestamp: additional information about data, as a time value generated by observing a clock source.

Generation timestamp: a timestamp attached to the sensor data, usually generated by the sensor and acquired by the sensor driver, or directly generated by the sensor driver based on the server time. This timestamp is considered to be a data generation time, which may also be referred to as a trigger timestamp.

Corrected timestamp: a timestamp obtained by correcting the generation timestamp.

Arrival timestamp: a time observed when the data arrives at the server.

Data delay: a difference between the arrival timestamp of the data frame and the generation timestamp. For a data stream, a delay is unavoidable and is usually affected by factors such as data acquisition and/or computation time, transmission time, operating system scheduling, etc. of a data source (a sensor, a data stream processing program, or the like).

Trigger frame: a virtual frame, wherein each data transmission period will delay data to be transmitted in this period as a large data frame to an algorithm module for calculation, and a specific moment (such as an end moment of the data transmission period or a start moment of the data transmission period) is also an algorithm trigger moment, corresponding to a virtual trigger frame.

FIG. 1 is a schematic diagram of a vehicle 100 in which various techniques of the present application may be implemented. The vehicle 100 may be a car, a truck, a motorcycle, a bus, a boat, an airplane, a helicopter, a lawn mower, a backhoe, a snowmobile, an aircraft, a touring vehicle, an amusement park vehicle, a farm installation, a construction installation, a streetcar, a golf cart, a train, a trolleybus, or other vehicles. The vehicle 100 may operate fully or partially in an autonomous driving mode. The vehicle 100 can control itself in the autonomous driving mode. For example, the vehicle 100 may determine a current state of the vehicle and a current state of an environment in which the vehicle is located; determine a predicted behavior of at least one other vehicle in the environment; determine a confidence level corresponding to the likelihood of the at least one other vehicle performing the predicted behavior; and control the vehicle 100 itself based on the determined information. The vehicle 100 in the autonomous driving mode may operate without human interaction.

The vehicle 100 may comprise various vehicle systems, such as a driving system 142, a sensor system 144, a control system 146, a user interface system 148, a control computer system 150, and a communication system 152. The vehicle 100 may comprise more or fewer systems, and each system may comprise a plurality of units. Further, each system and unit of the vehicle 100 may be interconnected. For example, the control computer system 150 may be in data communication with one or more of systems 142-148 and 152. Thus, one or more of the described functions of the vehicle 100 may be divided into additional functional or physical components, or combined into a smaller number of functional or physical components. In a further example, the additional functional components or physical components may be added to the example shown in FIG. 1.

The driving system 142 may comprise a plurality of operable components (or units) that provide kinetic energy to the vehicle 100. In one embodiment, the driving system 142 may comprise an engine or electric motor, wheels, a transmission, an electronic system, and power (or a power source). The engine or electric motor may be any combination of an internal combustion engine, a motor, a steam engine, a fuel cell engine, a propane engine, or other forms of engine or electric motor. In some embodiments, the engine may convert a power source into mechanical energy. In some embodiments, the driving system 142 may comprise a plurality of engines or electric motors. For example, a gasoline-electric hybrid vehicle may comprise a gasoline engine and an electric motor, or comprise other cases.

The wheels of the vehicle 100 may be standard wheels. The wheels of the vehicle 100 may be various types of wheels, including one-wheel, two-wheel, three-wheel, or four-wheel forms, such as those on a car or truck. Other numbers of wheels are possible, such as six or more wheels. One or more wheels of the vehicle 100 may be manipulated to rotate in a different direction than the other wheels. The wheels may be at least one wheel that is fixedly connected to the transmission. The wheels may comprise a combination of metal and rubber, or a combination of other substances. The transmission may comprise a unit operable to transmit mechanical power of the engine to the wheels. For this purpose, the transmission may comprise a gearbox, a clutch, a differential gear and a drive shaft. The transmission may also comprise other units. The drive shaft may comprise one or more axles that mate with the wheels. The electronic system may comprise a unit for transmitting or controlling an electronic signal of the vehicle 100. These electronic signals may be used to activate a plurality of lights, a plurality of servos, a plurality of motors, and other electronic drive or control devices in the vehicle 100. The power source may be an energy source that supplies the power to the engine or electric motor in whole or in part. That is, the engine or electric motor can convert the power source into mechanical energy. In an exemplary embodiment, the power source may comprise gasoline, petroleum, petroleum-based fuels, propane, other compressed gas fuels, ethanol, a fuel cell, a solar panel, a battery, and other electrical energy sources. Additionally or alternatively, the power source may comprise any combination of a fuel tank, a battery, a capacitor or a flywheel. The power source may also supply power to other systems of the vehicle 100.

The sensor system 144 may comprise a plurality of sensors for sensing information about the environment and conditions of the vehicle 100. For example, the sensor system 144 may comprise an inertial measurement unit (IMU), a global positioning system (GPS) transceiver, a radar unit, a laser rangefinder/LIDAR unit (or other distance measurement apparatus), an acoustic sensor, and a camera or image capturing apparatus. The sensor system 144 may comprise a plurality of sensors (e.g., an oxygen ($O_2$) monitor, a fuel gauge sensor, and an engine oil pressure sensor) for monitoring the vehicle 100. The sensor system 144 may also be configured with other sensors. One or more sensors comprised in the sensor system 144 may be driven individually or collectively to update positions, orientations, or both of the one or more sensors.

In some embodiments, each sensor collects data through hardware triggering or software triggering, and different sensors have different trigger frequencies, i.e., different data collection frequencies, and accordingly have different data collection periods. For hardware triggering, a trigger source uses a pulse per second signal as a trigger source signal, and generates a trigger signal and transmits this trigger signal to the corresponding sensor by means of adjustment according to the trigger frequencies required by different sensors, so as to trigger the corresponding sensor to collect data. Optionally, the camera has a trigger frequency of 20 Hz, the LIDAR has a trigger frequency of 1 Hz or 10 Hz, and the IMU has a trigger frequency of 100 Hz, all of which are not limited thereto.

The IMU may comprise a combination of sensors (e.g., an accelerometer and a gyroscope) for sensing changes in position and orientation of the vehicle 100 based on an inertial acceleration. The GPS transceiver may be any sensor used to estimate a geographic location of the vehicle 100. For this purpose, the GPS transceiver may comprise a receiver/transmitter to provide location information of the vehicle 100 relative to the earth. It should be noted that GPS is an example of a global navigation satellite system. Therefore, in some embodiments, the GPS transceiver may be replaced by a Beidou satellite navigation system transceiver or a Galileo satellite navigation system transceiver. The radar unit may use radio signals to sense objects in an environment in which the vehicle 100 is located. In some embodiments, in addition to sensing objects, the radar unit may also be used to sense a speed and heading of an object approaching the vehicle 100. The laser rangefinder or LIDAR unit (or other distance measuring apparatus) may be any sensor that uses laser to sense objects in the environment in which the vehicle 100 is located. In one embodiment, the laser rangefinder/LIDAR unit may comprise a laser source, a laser scanner, and a detector. The laser rangefinder/LIDAR unit is designed to operate in a continuous (e.g., using heterodyne detection) or discontinuous detection mode. The camera may comprise an apparatus for capturing a plurality of images of the environment in which the vehicle 100 is located. The camera may be a static image camera or a dynamic video camera.

The control system 146 is used to control the operations to the vehicle 100 and its components (or units). Accordingly, the control system 146 may comprise various units, such as a steering unit, a power control unit, a braking unit, and a navigation unit.

The steering unit may be a combination of machinery that adjusts the heading of the vehicle 100. The power control unit (which may be, for example, an accelerator) may be used, for example, to control an operating speed of the engine, and thus the speed of the vehicle 100. The braking unit may comprise a combination of machinery for decelerating the vehicle 100. The braking unit can use a friction to decelerate the vehicle in a standard manner. In other embodiments, the braking unit may convert the kinetic energy of the wheels into an electrical current. The braking unit may also take other forms. The navigation unit may be any system that determines a driving path or route for the vehicle 100. The navigation unit may also dynamically update the driving path as the vehicle 100 travels. Additionally or alternatively, the control system 146 may comprise other components (or units) not shown or described.

The user interface system 148 may be used to allow interactions between the vehicle 100 and an external sensor, other vehicles, other computer systems, and/or a user of vehicle 100. For example, the user interface system 148 may comprise a standard visual display device (e.g., a plasma display, a liquid crystal display (LCD), a touch screen display, a head-mounted display, or other similar display), a speaker or other audio output apparatus, and a microphones or other audio input apparatus. For example, the user interface system 148 may also comprise a navigation interface and an interface for controlling an interior environment (e.g., a temperature, a fan, etc.) of the vehicle 100.

The communication system 152 may provide means for the vehicle 100 to communicate with one or more devices or other surrounding vehicles. In an exemplary embodiment, the communication system 152 may communicate with one or more devices directly or via a communication network. The communication system 152 may be, for example, a wireless communication system. For example, the communication system may use 3G cellular communications (e.g., CDMA, EVDO, GSM/GPRS) or 4G cellular communications (e.g., WiMAX or LTE), and may also use 5G cellular communications. Optionally, the communication system may communicate with a wireless local area network (WLAN) (e.g., using WIFI®). In some embodiments, the communication system 152 may communicate directly with one or more devices or other surrounding vehicles, e.g., using infrared, Bluetooth®, or ZIGBEE. Other wireless protocols, such as various vehicular communication systems, also fall within the scope of the present disclosure. For example, the communication system may comprise one or more dedicated short range communication (DSRC) apparatuses, V2V apparatuses, or V2X apparatuses, all of which may perform public or private data communications with vehicles and/or roadside stations.

The control computer system 150 can control some or all of the functions of the vehicle 100. An autonomous driving control unit in the control computer system 150 may be used to identify, evaluate, and avoid or bypass potential obstacles in the environment in which the vehicle 100 is located. In general cases, the autonomous driving control unit may be used to control the vehicle 100 without a driver, or to provide assistance for the driver to control the vehicle. In some embodiments, the autonomous driving control unit is used to integrate data from the GPS transceiver, radar data, LIDAR data, camera data, and data from other vehicle systems to determine a travel path or trajectory of the vehicle 100. The autonomous driving control unit may be activated to allow the vehicle 100 to be driven in an automatic driving mode.

The control computer system 150 may comprise at least one processor (which may comprise at least one microprocessor) that executes processing instructions (i.e., instructions executable by a machine) stored in a non-volatile computer-readable medium (e.g., a data storage apparatus or memory). The memory stores at least one instruction executable by the machine; and the processor executes the at least one instruction executed by the machine to implement functions including a map engine, a positioning module, a perception module, a navigation or path module, an automatic control module and the like. The map engine and the positioning module are used to provide map information and positioning information. The perception module is used to perceive things in the environment where the vehicle is located according to information acquired by the sensor system and the map information provided by the map engine. The navigation or path module is used to plan a travel path for the vehicle according to the processing results of the map engine, the positioning module and the perception module. The automatic control module converts decision information input and analysis of modules such as the navigation or path module into control command output of the vehicle control system, and sends control commands to the corresponding components in the vehicle control system via a vehicle network (such as a vehicle internal electronic network system realized through a CAN bus, a local area interconnection network, or multimedia directional system transmission) to realize automatic control of the vehicle. The automatic control module can also acquire information of various components in the vehicle through the vehicle network.

The control computer system 150 may also be a plurality of computing apparatuses that controls components or systems of vehicle 100 in a distributed manner. In some embodiments, the memory may contain processing instructions (e.g., program logic) that are executed by the processor to implement various functions of the vehicle 100. In one embodiment, the control computer system 150 is capable of performing data communication with systems 142, 144, 146, 148 and/or 152. An interface in the control computer system is used to facilitate data communication between the control computer system 150 and the systems 142, 144, 146, 148, and 152.

The memory may also comprise other instructions, including an instruction for data transmission, an instruction for data reception, an instruction for interaction, or an instruction for controlling the driving system 142, the sensor system 144, or the control system 146 or the user interface system 148.

In addition to storing processing instructions, the memory may store various information or data, such as image processing parameters, road maps, and route information. These pieces of information may be used by the vehicle 100 and the control computer system 150 when the vehicle 100 operates in automatic, semi-automatic, and/or manual modes.

Although the autonomous driving control unit is shown as being separate from the processor and the memory, it should be understood that in some embodiments, some or all of the functions of the autonomous driving control unit may be implemented by using program code instructions residing in one or more memories (or data storage apparatuses) and executed by one or more processors; and the autonomous driving control unit may in some cases be implemented by using the same processor and/or memory (or data storage apparatus). In some embodiments, the autonomous driving control unit may be, at least in part, implemented by using various dedicated circuit logics, various processors, various field programmable gate arrays (FPGA), various application specific integrated circuits (ASIC), various real-time controllers and hardware.

The control computer system 150 may control functions of the vehicle 100 based on inputs received from various vehicle systems (e.g., the driving system 142, the sensor system 144, and the control system 146), or inputs received from the user interface system 148. For example, the control computer system 150 may control the steering unit by using input from the control system 146, so as to avoid an obstacle detected by the sensor system 144. In one embodiment, the control computer system 150 may be used to control various aspects of the vehicle 100 and its systems.

Although various components (or units) are shown to be integrated into the vehicle 100 in FIG. 1, one or more of these components (or units) may be mounted or individually associated to the vehicle 100. For example, the control computer system may exist partially or fully independent of the vehicle 100. Thus, the vehicle 100 can exist in a form of separate or integrated device units. The device units constituting the vehicle 105 may communicate with each other by means of wired communication or wireless communication. In some embodiments, additional components or units may be added to various systems or one or more of the above components or units (e.g., the LIDAR or radar shown in FIG. 1) may be removed from the systems.

As mentioned above, in order to realize multi-sensor fusion, it is necessary to provide a method to align a plurality of different input data streams, and the plurality of aligned data streams can be used as a data combination. One of the methods is to use an input data stream as a main data stream, and other data streams as auxiliary data streams. When the main data stream arrives at a frame, a frame whose data timestamp is closest to a newly arrived data timestamp of the main data stream is found out from all auxiliary data streams as a data combination. However, due to the inconsistency in delay between data streams, data obtained by a data stream with a larger delay may always be data generated at an earlier time point.

Another method is to precisely match arrival time points of different data streams, and use data with the same arrival timestamps in different data streams as a data combination. However, due to various influencing factors such as an error of a clock source inside the sensor, an error of sensor trigger time, a sensor driving program, and the scheduling of a software system, it is difficult to achieve the consistency in data timestamp based on the arrival timestamps, resulting a relatively large error. In addition, it is difficult to perform optimization from the sensor hardware level, and the sensitivity of reporting errors may be relatively low, thus it is difficult to ensure that a maximum delay can still be controlled in the case of system instability.

Figure 2:
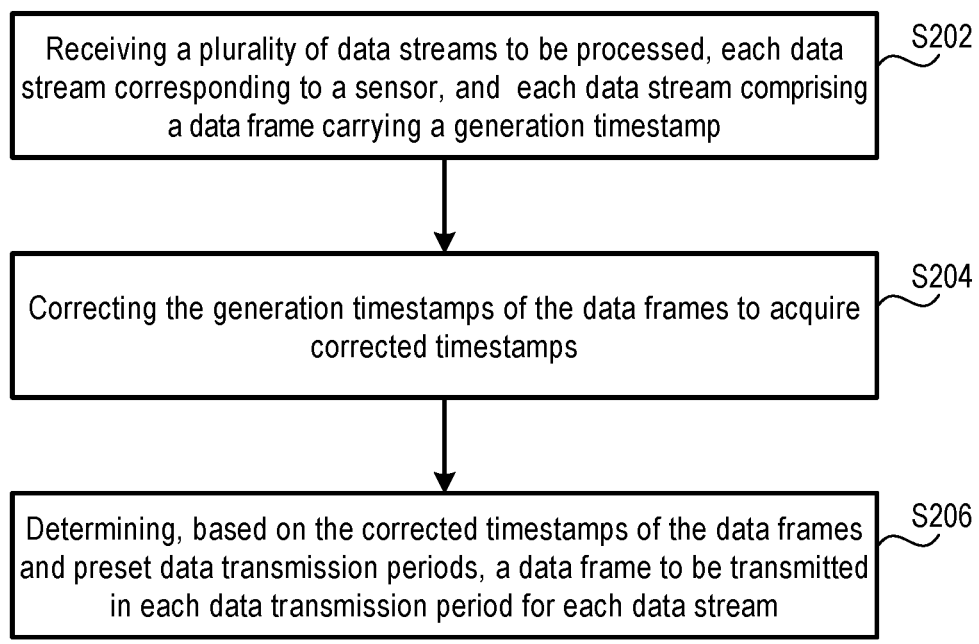
FIG. 2 is a flowchart of a method for processing sensor data according to an exemplary embodiment of the present application.

Therefore, the present application provides a scheme for data alignment according to the generation timestamps of respective sensor data, so as to transmit the data generated at the same moment as a data combination to an algorithm module for calculation. FIG. 2 is a flowchart of a method for processing network data according to an exemplary embodiment. Referring to FIG. 2, the method comprises:

step 202, receiving a plurality of data streams to be processed, each data stream corresponding to one sensor, and a data frame in each data stream having a generation timestamp;

step 204, correcting the generation timestamp of the respective data frame to acquire a corrected timestamp; and step 206, determining, based on the corrected timestamps of the respective data frames and preset data transmission period, the data frame to be transmitted in each data transmission period for each data stream.

In some embodiments, the plurality of data streams comprises at least one of an original data stream collected by each sensor and a post-processing data stream acquired by calculating the original data stream. That is, the plurality of data streams comprises at least one of: at least one original data stream and at least one post-processed data stream.

The original data stream is derived from a hard-triggered sensor and is generated by the sensor driving program, and the data frame in each original data stream carries a timestamp when the data frame is generated, that is, a generation timestamp. The post-processed data stream comprises a data stream generated by a data stream processing program that takes the original data stream as an input data stream, and also comprises a data stream generated by a data stream processing program that takes the post-processed data stream as an input data stream. That is, the data streams obtained after processing the original data stream one or more times are all post-processed data streams.

The data stream processing program will retain a sensor data timestamp of the input data stream and reflect it in its own output frame, so the post-processed data stream carries the corresponding generation timestamp of the original data stream. If a data frame of the original data stream is an original data frame, and a data frame of the post-processed data stream is a post-processing data frame, each post-processed data frame carries the corresponding generation timestamp of the original data frame.

In some embodiments, the step S202 of receiving the plurality of data streams to be processed comprises: setting a buffer queue corresponding to each data stream in a data buffer for temporarily storing data; and storing the respective data frames in the corresponding buffer queue according to the generation timestamps of the respective data frames in the respective data streams.

Figure 3:
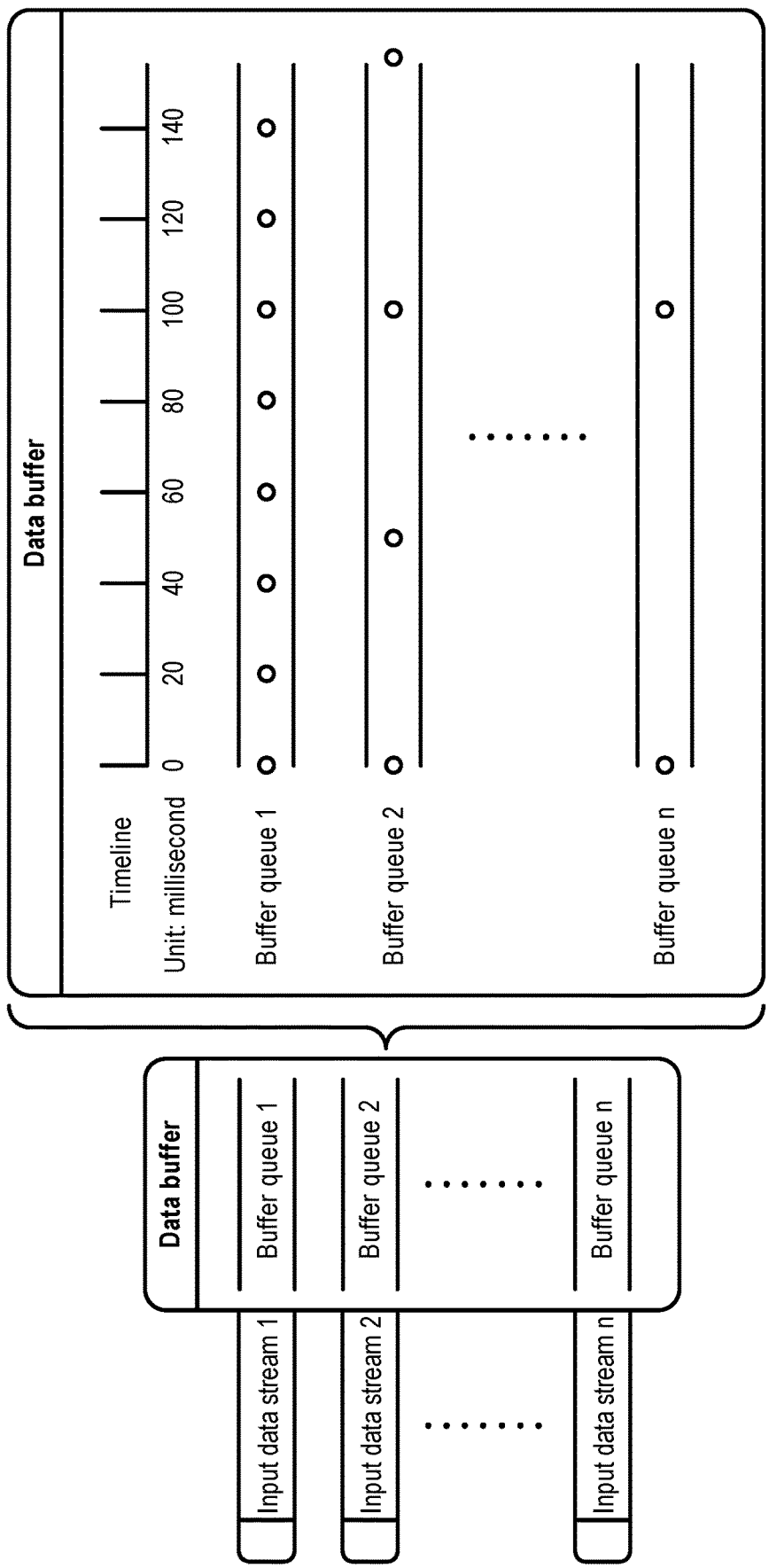
FIG. 3 is a schematic diagram of a data buffer queue according to an example of the present application.

FIG. 3 is a schematic diagram of buffer queues for different input data streams according to an exemplary embodiment of the present application. Each data stream has a corresponding data collection period (or data generation period or sensor trigger period) and a buffer queue. For example, the data stream 1 has a sensor trigger frequency of 50 Hz and a corresponding data collection period of 20 ms; the data stream 2 has a sensor trigger frequency of 20 Hz and a corresponding data collection period of 50 ms; and the data stream n has a sensor trigger frequency of 10 Hz and a corresponding data collection period of 100 ms.

In some embodiments, each data frame has a frame identifier (i.e., frame ID), and each frame identifier has a unique generation timestamp corresponding to it. Thus the computing device receives data frames having a generation timestamp and frame ID, and stores the data frames of each data stream into the corresponding data buffer. The computing device determines the frame ID of each data stream which should be aligned to a large trigger frame based on the generation timestamp of each data frame, and then combines the data frames in the data buffer corresponding to the determined frame ID to get a trigger frame, and then sends the trigger frame to the algorithm module. In some embodiments, the computing device has a timeline based on server time and aligned the frame ID of each data stream based on the timestamps of the data frame.

In some embodiments, the data buffer has a timeline based on server time. When any data stream has data access, the buffer will, based on a sensor trigger timestamp, place the data on a timeline position corresponding to a hard-triggered timestamp in the buffer queue to temporarily store the data.

In addition, since the input data stream has a hard-triggered feature, a plurality of data streams will generate data at the same time at every predetermined period (for example, 1 s), so the plurality of data streams will be automatically aligned at every predetermined period. It can be seen that at time 0 of the timeline (i.e., at the start of one second), each buffer queue will have a data point, and the data points in each buffer queue are equally spaced.

In some embodiments, the step S204 of correcting the generation timestamp of the respective data frame comprises: correcting the generation timestamp of the respective data frame in the data stream to the nearest integer timestamp according to a tolerance error of the respective data stream. For example, if the generation timestamp is 17 ms, it is corrected to 20 ms. Generally, as long as there is a new data frame in the buffer, a data alignment algorithm can be executed on the new data, and the execution of the alignment algorithm can be suspended when the algorithm module executes the calculation, so as to save resources and ensure the real-time performance. In addition, if the generation timestamps of two data frames are corrected to the same integer timestamp, the data frame that arrives first is retained, or only the data frame whose generation timestamp is closer to the integer timestamp is retained.

In some implementations, if the tolerance error is $t_{error}$, and the generation timestamp of a data frame is $t_{generation}$, then the corrected timestamp $t_{corrected}$ of the data frame=$\lfloor t_{generation}\ t_{error}+a \rfloor \times t_{error}$, wherein "$\lfloor\ \rfloor$" represents round down operation, a is a preset constant, such as 0.5. The tolerance error of the respective data stream is a factor of the data collection period of the data stream and is less than half of the data collection period, i.e., $t_{error} < T/2$. For example, for a 10 Hz data stream, the data collection period is 100 ms, then the $t_{error}$ may be set to 5 ms, 10 ms, 20 ms or other values. It should be understood that a is a factor of b means a is evenly divisible by b.

In some embodiments, the step 206 of determining the data frame to be transmitted in each data transmission period from the respective data streams comprises: determining, for any data stream, a target timestamp corresponding to the current data transmission period in the data stream; determining, in response to a corrected timestamp of a data frame of the data stream matching the target timestamp, the data frame as a to-be-transmitted data frame of the data stream in the current data transmission period; and determining, in response to no data frame whose correction timestamp matching the target timestamp in the data stream, that the data stream has no to-be-transmitted data frame in the current data transmission period. The current data transmission period means the data transmission period in which the target timestamp falls.

Here, the data transmission period refers to a period in which a data combination is transmitted to the algorithm module. At the end of each period or the start of each period, the aligned data will be combined and delivered to the algorithm module for calculation, wherein the end time corresponds to a virtual trigger frame. One of the objects of the present application is to determine the data frames corresponding to the same trigger frame in different data streams, and to use these data frames as a large data frame and deliver them to the algorithm module for calculation. For example, if the user wants to trigger a module algorithm at a frequency of 20 Hz, there will be a trigger frame at 0 ms, 50 ms, 100 ms, 150 ms and other positions of the timeline, respectively. In consideration of the inconsistency in data collection periods of different data streams, the same data frame of a data stream may correspond to one or more trigger frames. For example, in a mapping relationship of trigger frames in different data streams in FIG. 4, the first data frame in a buffer queue 3 is mapped to both a trigger frame 1 and a trigger frame 2.

In an embodiment, the step of determining the target timestamp corresponding to the current data transmission period in the data stream comprises: determining an expected timestamp sequence of the data stream based on a data collection period of a sensor corresponding to the data stream; and selecting a target timestamp corresponding to the current data transmission period from the expected timestamp sequence.

Further, the step of selecting the target timestamp corresponding to the current data transmission period from the expected timestamp sequence comprises: selecting at least one candidate timestamp from the expected timestamp sequence; and using a maximum value of the at least one candidate timestamp as the target timestamp. The candidate timestamp is not later than an end moment of the current data transmission period, and the end moment is also the timestamp of the trigger frame.

It is set that the frequency of the current data stream is f, and its data collection period T=1/f, then the expected timestamp sequence is $L=\{k \cdot T, \forall k \in N\}$, where N is a set of natural numbers. For example, if the data collection period is 20 ms, the expected timestamp sequence is 0 ms, 20 ms, 40 ms, 60 ms, . . . , and so on.

Assuming that the end moment of the data transmission period of the data stream is $t_{end}$, the candidate timestamps are those timestamps less than or equal to $t_{end}$, and the target timestamp is $=\max\{t, t \in L \cap t \leq t_{end}\}$. Assuming that the timestamp of the trigger frame is 60 ms, the candidate timestamps determined from the expected timestamp sequence are 0 ms, 20 ms, 40 ms, and 60 ms, and the maximum value of the candidate timestamp is 60 ms, which is the target timestamp.

In some embodiments, the match between the corrected timestamp of a data frame and the target timestamp means that the corrected timestamp of the data frame is equal to or similar to the target timestamp. If the corrected timestamp of the data frame is equal to the target timestamp, a mapping relationship between the data frame and the corresponding trigger frame is established. In the present application, the data frame to be transmitted of each data stream in each data transmission period is determined. When the data frame to be transmitted of a data stream in the current data transmission period is determined, a mapping relationship between the data frame and the current trigger frame is established. In the case of reasonable parameter settings and accurate data stream transmission, as new data is continuously imported in the data stream, a trigger frame will gradually generate a mapping relationship with a data frame in each data stream.

In some embodiments, the plurality of sensors generates data frames once at the same time at every predetermined period. Therefore, the step S206 of determining the data frame to be transmitted in each data transmission period from the respective data streams comprises: calculating, for any data stream, a corrected timestamp difference between the current data frame in the data stream and a start data frame of the current predetermined period; and determining, in response to a ratio of the corrected time stamp difference to the data collection period of the data stream being a non-integer value, that the data frame is an erroneous frame of the data stream, and discarding the erroneous frame. For example, a hard-triggered data stream with a trigger frequency of 10 Hz generates a frame of data with a corrected timestamp of 370 ms. Because 370 ms is not an integer multiple of 100 ms, it can be determined that the data with a corrected timestamp of 370 ms is a wrong frame.

In some embodiments, the step S206 of determining the data frame to be transmitted in each data transmission period from the respective data streams comprises: calculating, for any data stream, a corrected timestamp difference between the current data frame in the data stream and a previous data frame; calculating a ratio m of the corrected time stamp difference to the data collection period of the data stream; determining, in response to m being a non-integer value, that the data frame is an erroneous frame of the data stream, and discarding the erroneous frame; and determining, in response to m being an integer other than 1, that m−1 frames are lost between the current data frame and the previous data frame.

Optionally, the current predetermined period is each 1s period. For a data stream, a difference $\Delta t_1$ between the corrected timestamp of the current data frame and the start time of the current 1s period (or the corrected timestamp of the start frame) is calculated. If $\Delta t_1/T$ is a non-integer, the data frame is a wrong frame. For another example, the difference value $\Delta t_2$ between the corrected time stamps of front and rear two frames is calculated, and if $\Delta t_2/T$ is a non-integer, the data frame is a wrong frame. If $\Delta t_2/T$ is an integer other than 1, then $\Delta t_2/T-1$ frames are lost from the two front and rear frames, and the corresponding target timestamp position may be determined to lose a frame.

For example, if the data collection period is 20 ms, but the corrected timestamp of the previous frame is 20 ms, and the corrected timestamp of the current frame is 80 ms, it is determined that two frames are lost from these two frames, and the positions of 40 ms and 60 ms are determined to lose frames. Alternatively, for a 10 Hz hard-triggered data stream, the expected time difference is 100 ms; but if the time difference between the two front and rear frames is 160 ms after the data correction process, one of the front frame or the rear frame is considered as a wrong frame. As the timestamps is processed and aligned in chronological order, so the rear frame is generally considered as a wrong frame.

Scenarios where frames are lost comprise, but are not limited to: the sensor does not generate data, the sensor driving program fails to acquire data, the data stream processing program calculates abnormally, and the like. A frame drop inspection system in the present application is based on corrected timestamp, which can avoid the situation of "approximately equal to", and only needs to determine whether the time difference between the two front and rear frames is an integer multiple of other than 1 compared to the expected time difference.

In some embodiments, after determining that the current data stream is lost in frame, the method 200 may further comprise at least one of the following steps, so that the system can perceive the frame drop in time and process it in time:

1) externally reporting the abnormality of the current data stream;
2) marking the trigger frame corresponding to the frame drop time as frame drop, without considering this trigger frame in subsequent operations; or
3) informing a downstream algorithm module of a specific time of frame drop.

Scenarios where a wrong frame occurs include, but are not limited to: abnormal sensor time, abnormal server time, abnormal timing system, abnormal data acquisition by the sensor driving program, abnormal calculation of the data stream processing program, etc., which is manifested that in the data stream with hard-triggered characteristics, the difference between the timestamps of the two front and rear frames cannot be corrected by the correction algorithm to be an integer multiple of the expected time difference (an inverse of the frequency). A wrong frame inspection system in the present application is also based on corrected timestamp, and only needs to determine whether the time difference between the two front and rear frames is a non-integer multiple compared to the expected time difference.

In some embodiments, after determining that the current data stream has a wrong frame, the method 200 may further comprise at least one of the following steps to ensure the safety operation of the system:

1) externally reporting the abnormality of the current data stream;
2) informing the downstream algorithm module that the data stream may start to have errors; or
3) switching, after the errors have accumulated to a certain extent, to a backup system or perform a safety action.

In some embodiments, the step S206 of determining the data frame to be transmitted in each data transmission period from the respective data streams comprises:

determining, in response to a position corresponding to the target timestamp in a data stream being determined to miss a frame (i.e., in response to determining a frame drop at the target timestamp for the data stream), that the data stream has no to-be-transmitted data frame in the current data transmission period; and determining, in response to no new data frame of the data stream being received within a predetermined period from the target timestamp, that the data stream has timed out, and the data stream has no to-be-transmitted data in the current data transmission period.

In some embodiments, if a time stamp position is determined to miss a frame, have a wrong frame or time out (i.e., if a frame drop, a wrong frame, or frame time out for the data stream is determined at the target timestamp), this timestamp can be marked as frame drop, wrong frame or timeout. The wrong frame can be discard directly. If a target timestamp position is marked as frame drop or timeout, it means that the current trigger frame cannot be mapped with the data stream, that is, there is no data to be transmitted in the current data transmission period. In addition, for a trigger frame, the data stream for which the mapping relationship has been established can be marked as "Mapping Established", the data stream corresponding to the data frame timeout can be marked as "timeout", and the data stream corresponding to the data frame from which a data frame is lost can be marked as "frame drop". After all data streams corresponding to the trigger frame have marked the states (including "Mapping Established", "Timeout", and "Frame drop"), it means that the mapping of the trigger frame is completed, the trigger frame is complete, and the data frame of the data transmission period is complete, but trigger frame may be mapped to an empty frame in some data streams. The mapped data frame may then be delivered to the algorithm module as one large frame.

In some embodiments, the predetermined duration may be a preset tolerance delay, for which a global tolerance delay may be set, or a corresponding tolerance delay may be individually set for each data stream, which is not limited in the present application. For each incomplete trigger frame: an expected timestamp of an unreached data frame is calculated; it is determined that the corresponding time stream has timed out and this data stream has no data to be transmitted in the current data transmission period, in response to a difference between a current system time and the expected timestamp being greater than the set tolerance error; otherwise, it is necessary to continue to wait for the arrival of the expected data frame.

It should be understood that in some sensor fusion algorithms, there may sometimes be situations where data drop is allowed to ensure the real-time performance. For example, an algorithm that fuses object tracking results of a plurality sensors to model road conditions will receive inputs from a plurality of data streams, and the normal operation of the algorithm cannot be affected by the occasional lack of inputs of a data stream. In addition, according to an execution flow of the data frame alignment algorithm, the delay time of the resulting large data frame is a maximum delay value of all data streams. Therefore, when an abnormality occurs in a data stream, such as high delay and no data generation, it results in too high delay, even operation stop of the alignment algorithm.

Therefore, in the present application, a delay checking system is added in addition to the data alignment system, both of which are operated independently and can communicate with each other. The delay checking system can be continuously executed, and a mechanism such as a timer or a delay trigger may be used to periodically check the timeout state of the data stream.

In one embodiment, the timer is provided to check whether there is data flow timeout at every predetermined period.

In another embodiment, an overall latest time is calculated for an incomplete trigger frame by combining the above-mentioned tolerance delay of each data stream configuration, an observation time of the current server and a mapping situation of the data frame; and the data timeout can be determined in response to no new data frame being received before this time.

Specifically, with respect to a data transmission period (or the first incomplete trigger frame) of the first data frame in the system, an overall latest moment is calculated according to the expected timestamp of each data stream, the tolerable delay, and the actual time (also called system time) observed by the server. It is determined that all the waiting data streams have timed out in response to no new data frame arriving for each data stream waiting before the overall latest moment. The data transmission period is mapped as an empty frame in these data streams, and the current trigger frame is a complete trigger frame in which some data frames have timed out. If a new frame of data arrives among one or more of the waiting data streams before the overall latest moment, a corrected timestamp of the new data frame is calculated according to the alignment algorithm. The alignment algorithm is then re-executed, and whether the overall latest moment needs to be updated according to whether there are still unreached data frames.

Here, each data transmission period has a local latest moment in each waiting data stream. The local latest time $t_{k,local}$ of a data transmission period in a data stream k is a sum of the expected timestamp $t_{k,expected}$ of the expected data frame and the tolerance delay $t_{k,delay}$ of the data stream, that is, $t_{k,local} = t_{k,expected} + t_{k,delay}$. However, the global latest time of the data transmission period is a maximum value of the local latest time of each unarrived data stream, that is, $t_{global} = \max\{t_{k,local}, \forall k \in S_{unarrived}\} = \max\{t_{k,expected} + t_{k,delay}, \forall k \in S_{unarrived}\}$, wherein $S_{unarrived}$ is a data stream set of all unarrived data frames.

For example, assuming that the data frames in the data streams 2 and 3 in the current data transmission period have not arrived, if the expected timestamp of the data transmission period in a data stream 4 is 30 ms and the tolerable delay is 20 ms, the local latest time of the data transmission period in the data stream 4 is 50 ms. If the expected timestamp of the data transmission period in a data stream 5 is 60 ms and the tolerable delay is 30 ms, the local latest time of the data transmission period in the data stream 5 is 90 ms. Therefore, the global latest time of the data transmission period is a maximum value of the two local latest time, that is, 90 ms.

In some embodiments, under the current system time of the high-delay check, the system only needs to wait for the occurrence of either "global latest time is coming" or "new data frame in waiting arrives". If an event that occurs is "global latest time is coming", all data frames that have not arrived are directly marked as timeout; and if an event that occurs is "new data frame in waiting arrives", the alignment algorithm is re-executed, a corrected timestamp of the new data frame is calculated, and it is determined whether the new data frame can be mapped to the trigger frame. In addition, it is determined whether the current data transmission period still has unreached data frames (that is, whether the current trigger frame still has unmapped data streams). If there is still an unarrived data frame, it means that the trigger frame is not complete, and it is necessary to continue to update the global latest time according to the expected timestamp of the expected data frame and the tolerance delay of the corresponding data stream until the data frame of the data transmission period is complete.

In yet another embodiment, if a trigger frame has been mapped in other multiple data streams, a high-delay checking algorithm can be started to check whether the trigger frame has timed out in the remaining data streams. Preferably, if a trigger frame has been mapped in other data streams, the high-delay checking algorithm can be started to check whether the trigger frame has timed out in the last data stream.

After checking, for a trigger frame, if the states of all data streams are found to be "Mapped" or "Marked as Timeout", the trigger frame can be regarded as a complete trigger frame with empty data. Through the delay check, the maximum delay of the alignment algorithm can be controlled within the tolerance delay, and problems such as abnormal system operation caused by the high delay of a single data stream can be avoided.

In addition, regarding the integrity determination of the trigger frame, in an embodiment, if the current trigger frame (or the current data transmission period) has a mapping relationship with all data streams, the trigger frame is considered to be complete; on the contrary, if a data stream does not have a mapping relationship, it is considered that the trigger frame is incomplete, so this method is mainly aimed at an algorithm module that requires relatively high data integrity. In another embodiment, for each trigger frame, those streams that have no data to send are excluded. If the corresponding data frames have been determined in the remaining data streams (the mapping relationship has been established), it is determined that the trigger frame is complete, or is referred to as a complete trigger frame containing empty data. This method is mainly aimed at an algorithm module that requires low data integrity.

Therefore, in the present application, the judgment requirements for the trigger frame can be determined according to the calculation accuracy requirements delivered to the algorithm module. For an algorithm module with high requirements, each data stream must be mapped before being delivered to the algorithm module, while for an algorithm module with low requirements, only those data streams that have to-be-transmitted data frames need to establish a mapping relationship.

Figure 4:
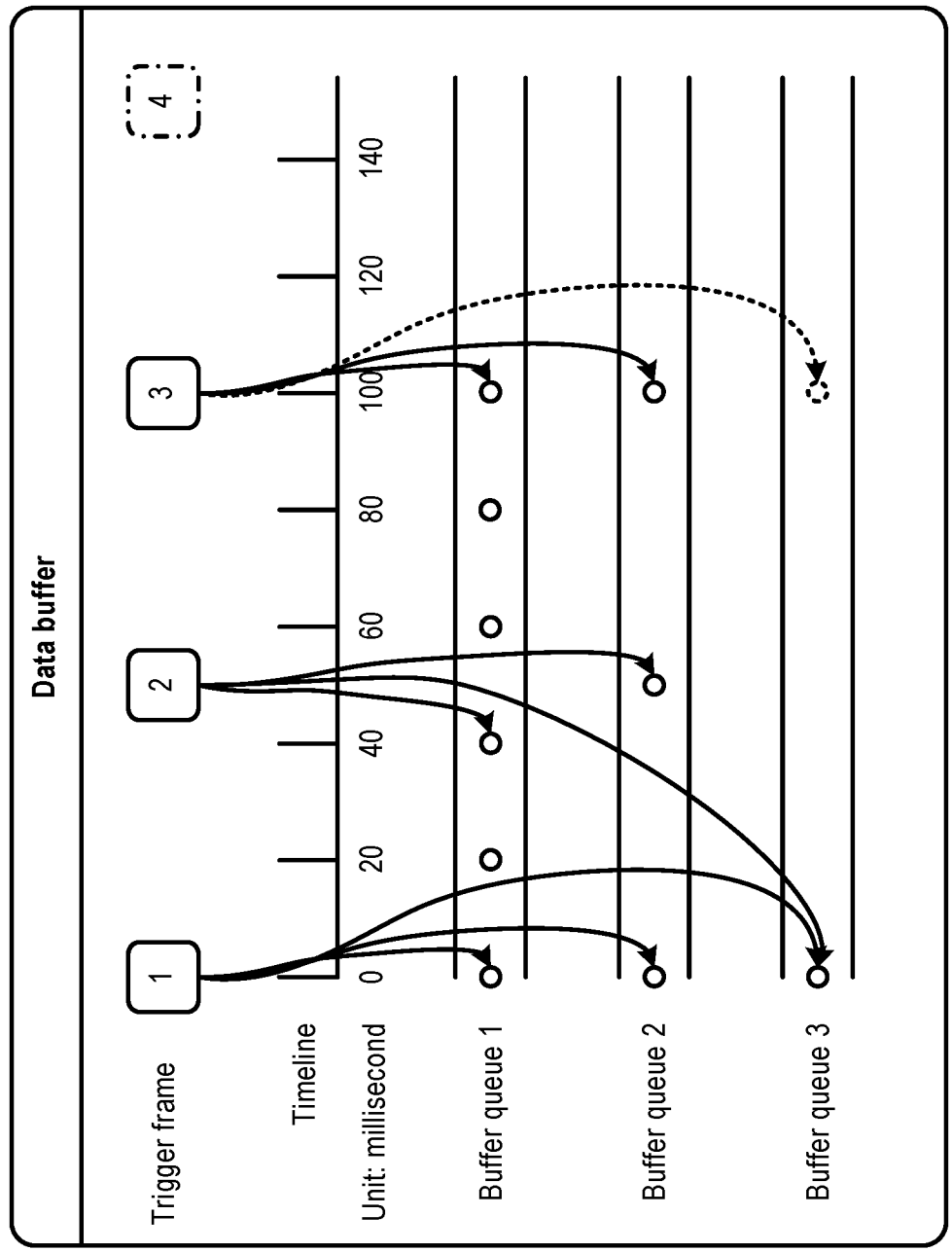
FIG. 4 is a schematic diagram of a mapping relationship of trigger frames in different data streams according to an example of the present application.

For example, a trigger frame 1 and a trigger frame 2 in FIG. 4 have corresponding data frames in three buffer queues, and are considered to be complete trigger frames. The trigger frame 3 only establishes a mapping relationship with data frames in a buffer queue 1. However, when the buffer queue 3 is marked as "timed out" by a delay detection algorithm, the trigger frame 3 is considered to be a complete trigger frame with empty data. The trigger frame 4 does not establish a mapping relationship with any buffer queue, and is considered to be an incomplete trigger frame. Assuming that the corresponding target timestamp positions of the trigger frame 4 in the buffer queue 2 and the buffer queue 3 are lost or timed out, it is determined that there is no data frame to be transmitted in the data stream. At this time, the trigger frame 4 may also be considered to be a complete trigger frame containing empty data.

In some embodiments, after the step S206, the method may further comprise the following step: delivering a combination of the determined data frames to be transmitted in each data transmission period to the algorithm module for calculation. Here, the data may be transmitted to the algorithm module for calculation, or the data may be read by the algorithm module, which is not limited in the present application.

According to the technical solutions of the present application, the data streams with hard trigger characteristics can be aligned, and the data frames with the same hard trigger timestamp can be combined into a large frame, which is then delivered to the algorithm module for calculation, thereby ensuring the correctness of the data while achieving a certain tolerance for errors. In addition, in the present application, when an abnormality, including but not limited to wrong hard trigger timestamp, frame drop or high data delay, occurs in the data stream, the abnormality can be detected and responded in time to ensure the real-time performance and security of the system.

Following is an example application of the data scheme described herein to three data streams existing in the system:

The data stream 1 is an original data stream generated by a hard trigger sensor, with an extremely small error between a sensor time and a server time; a hardware trigger frequency $f_1$ is 50 Hz, that is, a data acquisition period is 20 ms; a sensor driving program may correctly acquire a generation time of each frame of data without error; the delay is about 10 ms, fluctuating in a small range of 2 ms; and data loss is possible.

The data stream 2 is an original data stream generated by a hard trigger sensor, with an extremely small error between a sensor time and a server time; a sensor driving program may correctly acquire a generation time of each frame of data without error; a hardware trigger frequency $f_2$ is 20 Hz, that is, a data acquisition period is 50 ms; for some reason, the sensor may produce data with large deviations in individual timestamps, but is still stable entirely; and the delay is about 40 ms, fluctuating in a range of 10 ms.

The data stream 3 is a post-processed data stream generated by a data stream processing program; the hardware trigger frequency $f_3$ is 10 Hz, that is, the data acquisition period is 100 ms; and the delay is unstable, which may be as low as 10 ms or as high as 500 ms.

Figure 5A:
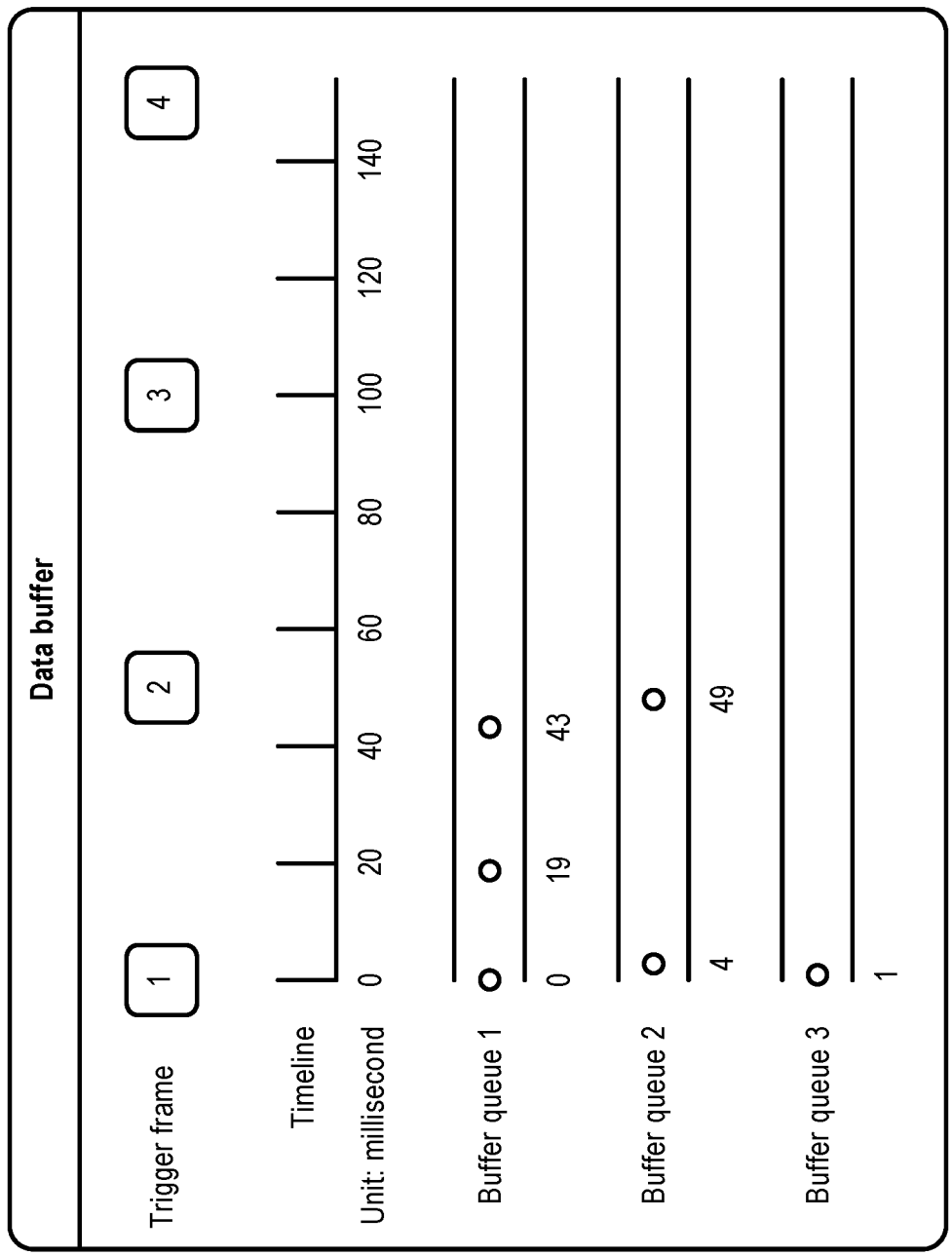
FIG. 5A is a schematic diagram of a generated timestamp according to an example of the present application.
Figure 5B:
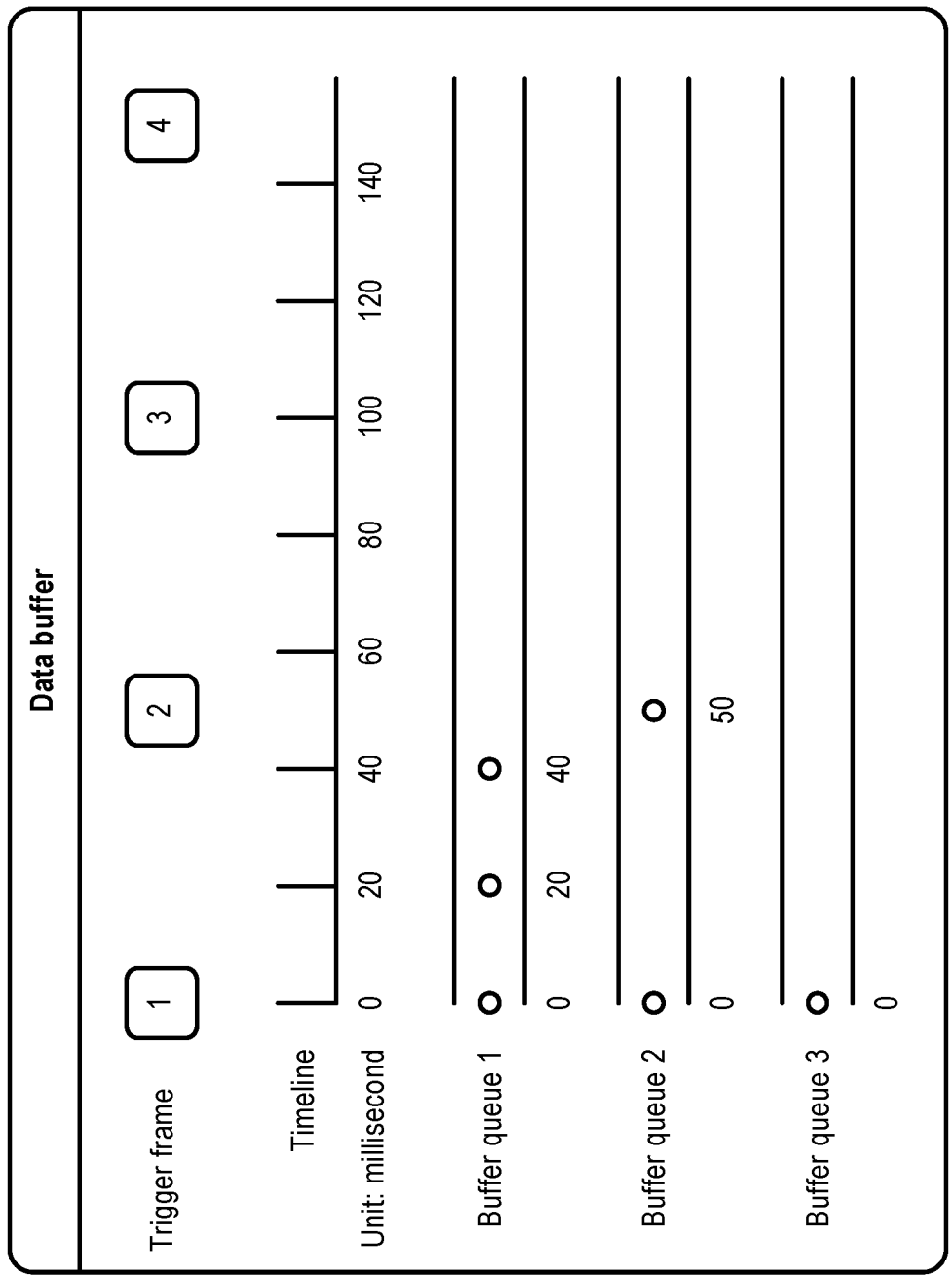
FIG. 5B is a schematic diagram of a corrected timestamp according to an example of the present application.

The global tolerance error $t_{error}$ is 10 ms, and the data transmission period (i.e., an algorithm module trigger period) is 50 ms. FIG. 5A shows a schematic diagram of generation timestamps of different data streams. The generation timestamps of three data frames of the data stream are 0 ms, 19 ms, and 43 ms, respectively, which are substitute into $t_{corrected} = \lfloor t_{generation}/t_{error} + 0.5 \rfloor \times t_{error}$, to obtain the corresponding corrected timestamps of 0 ms, 20 ms, and 40 ms. The generation timestamps of two data frames of the data stream 2 are 4 ms and 49 ms, and the corresponding corrected timestamps are 0 ms and 50 ms. The corrected timestamps of each data stream are shown in FIG. 5B.

For the second data transmission period (that is, the trigger frame 2), the corresponding expected timestamp sequence in the data stream 2 is L={0 ms, 50 ms, 100 ms, . . . }, so the candidate timestamps are {0 ms, 50 ms}, the target timestamp is max{0 ms, 50 ms}=50 ms. In the data stream 2, there is a data frame whose correction time stamp is also 50 ms, that is, the second data frame. Therefore, a mapping relationship between the data frame and the trigger frame 2 is established.

Figure 6A:
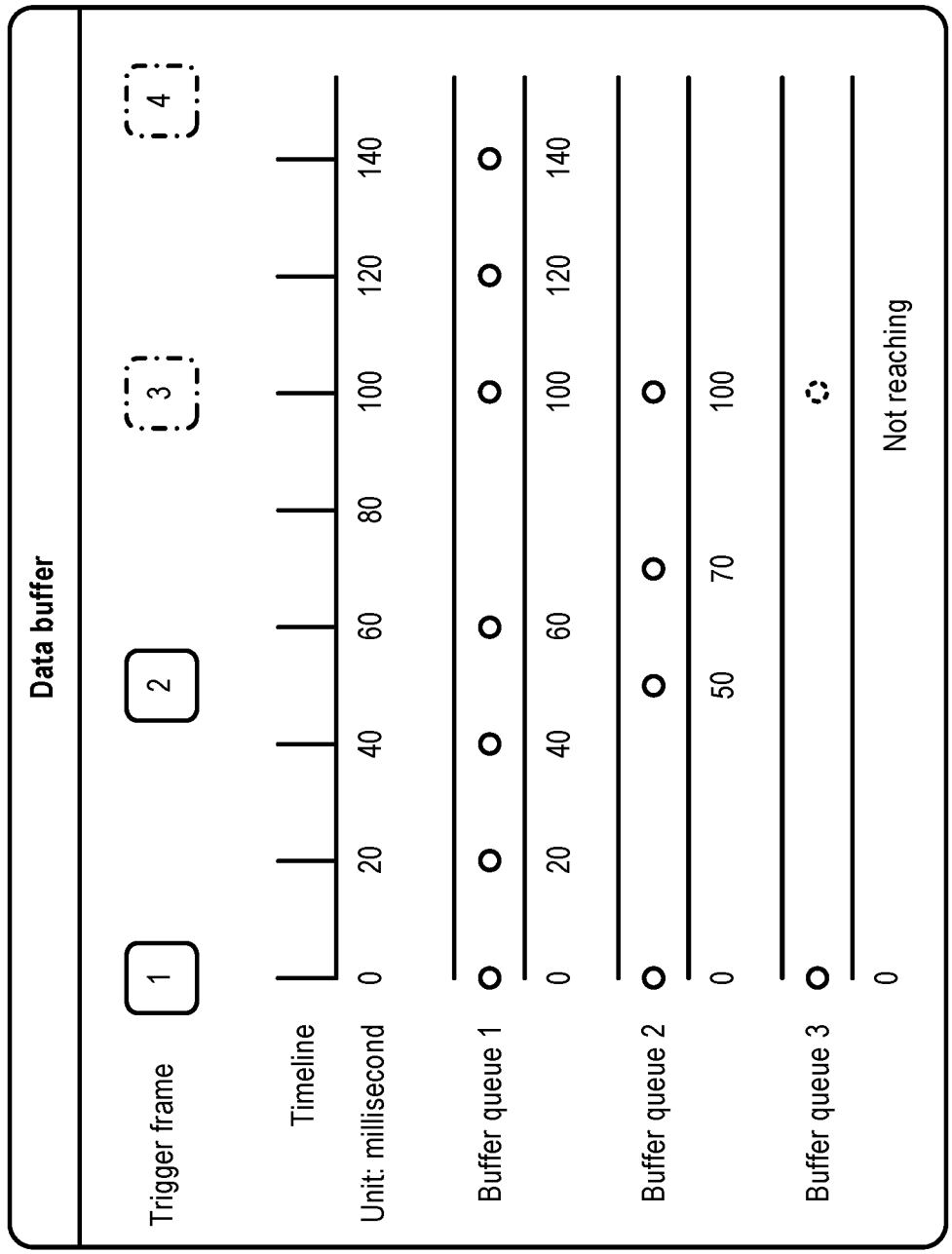
FIG. 6A shows a schematic diagram of frame drop and an erroneous frame as well as a high-delay check according to an example of the present application.

FIG. 6A is a schematic diagram of frame drop, wrong frame and high-delay check in the present application, wherein the data stream 1 has two frames of data in the front and rear of 60 ms and 100 ms, 100 ms−60 ms=40 ms=2*20 ms, so one frame is lost between these two frames, and the frame drop position is at 80 ms. For a frame with a timestamp of 70 ms in the data stream 2, a time difference between the front and rear frames is 70 ms−50 ms=20 ms=0.4×50 ms; and since 0.4 is a non-integer multiple, this frame is determined to be a wrong frame.

In some embodiments, it is assumed that the high-delay check begins when the system is at a time of 181 ms. It is known that the data mapping of the trigger frame 3 in the buffer queue 1 and the buffer queue 2 has been completed at a position of 100 ms, so that a high-delay checking algorithm directly starts to check the delay of the buffer queue 3. Calculated from the data collection period of the data stream 3, the expected timestamp is 100 ms, the tolerance delay is 80 ms, where 181 ms−100 ms>80 ms, so that the buffer queue 3 corresponding to the trigger frame 3 is marked as timeout. At this time, the data of the trigger frame 3 in all buffer queues is in a "Mapped" or "Timeout" state, so that the trigger frame 3 becomes a complete trigger frame.

In other embodiments, assuming that the real time $t_{real-time}$ observed by the server is 130 ms, and the first incomplete trigger frame in the system is the trigger frame 3, data frames of this trigger frame at a position of 100 ms in the buffer queues 1 and 2 have arrived. It is expected that there will be a frame of data at the position of 100 ms in the buffer queue 3, but this data frame has not yet arrived. At this time, upon calculation, the latest time $t_{global} = \max\{t_{k, expected} + t_{k, delay}, \forall k \in S_{unarrived}\}$, wherein $S_{unarrived}$ only involves the data stream 3, and the local latest time of the data stream is 180 ms, which is the latest time of a high-delay check in the current system. Assuming that the waiting data frame has not arrived at 180 ms, the data frame is marked as timeout. Upon calculation, the waiting time for the high-delay check system is as $t_{global} - t_{real} = 180$ ms−130 ms=50 ms. During the waiting period, if no new data frame arrives in the data stream 3, the data frame at the waiting position will be marked as timeout. At this time, the data of the trigger frame 3 in all buffer queues has a marked state. Therefore, the complete trigger frame containing the timeout data is delivered to the algorithm module for calculation. If a new data frame arrives in the waiting data stream, it is determined whether the newly arrived data frame can be mapped to this trigger frame, and if yes, it means that the trigger frame is complete.

Figure 6B:
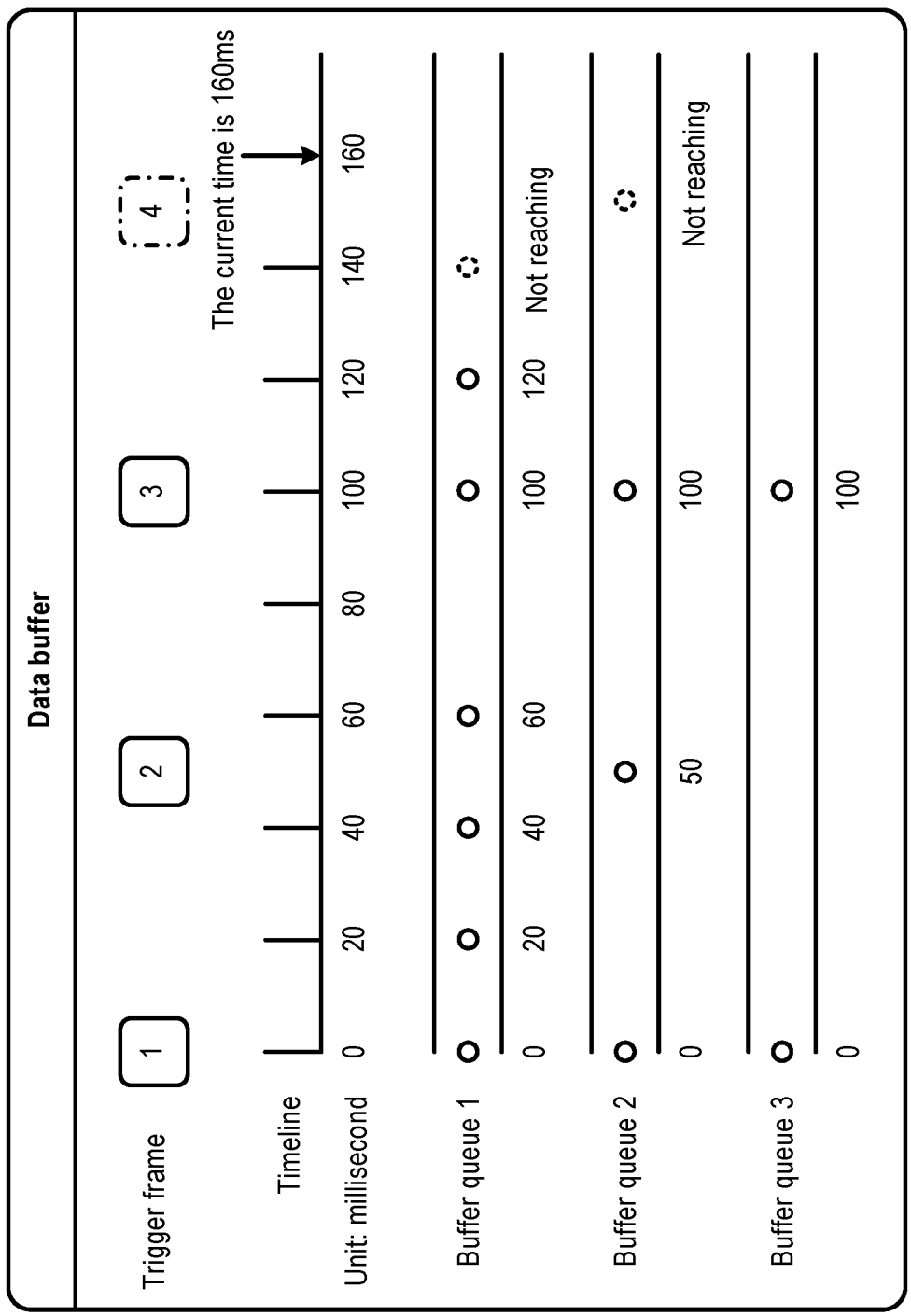
FIG. 6B shows a schematic diagram of a high-delay check according to another example of the present application.

In other embodiments, as shown in FIG. 6B, assuming that the real time treat observed by the server is 160 ms, and the first incomplete trigger frame in the system is the trigger frame 4, data frames of this trigger frame at a position of 100 ms in the buffer queue 3 have arrived. It is expected that there will be a frame of data at a position of 140 ms in the buffer queue 1 and a position of 150 ms in the buffer queue 2, but these two data frames have not yet arrived. At this time, upon calculation, the local latest time of the data stream 1 and the local latest time of the data stream 2 are 170 ms and 210 ms, respectively. Therefore, the global latest time is 210 ms, and the current waiting time to the global latest time is 210 ms−160 ms=50 ms. During the waiting period, if no new data frame arrives in the waiting data streams 1 and 2, the position of 140 ms in the buffer queue 1 and the position of 150 ms in the buffer queue 2 are marked as timeout respectively. At this time, the trigger frame 4 is determined as a complete trigger frame containing timeout data, and is delivered to the algorithm module for calculation.

If during the waiting period of 50 ms in FIG. 6B, for example, at the time $t_{real}=165$ ms, the data frame of the buffer queue 2 at the position of 150 ms arrives, there is still a data frame of the data stream 1 that has not arrived at this time. Therefore, the global latest time is updated as the local latest time of 170 ms in the data stream 1, and the updated waiting time is 170 ms−165 ms=5 ms. At this time, the high-delay waiting system needs to wait for another 5 ms. If no new data frame of the data stream 1 arrives within 5 ms, the data stream 1 can be marked as timeout.

Alternatively, during the waiting period of 50 ms in FIG. 6B, for example, at the time $t_{real}=180$ ms, the data frame of the buffer queue 2 at the position of 150 ms arrives. Although the updated global latest time is still 170 ms, there is no need to wait any longer because the current system time has exceeded the global latest time. The trigger frame 4 is determined as a complete trigger frame containing timeout data (buffer queue 1), and is delivered to the algorithm module for calculation.

According to the technical solutions of the present application, by performing timestamp alignment processing on a plurality of input data streams at a software level, it is ensured that the data delivered to the algorithm module is generated by a plurality of sensors at the same time and/or by post-processing the data generated at the same time, which can better meet the requirements of multi-sensor fusion for input data and improve the accuracy of the algorithm. The present application achieves an efficient and predictable data alignment system, which, in an autonomous driving system that requires high real-time performance, can save computing resources and improve the response speed of the algorithm; and the reproducibility of the results makes debugging easier when the system has problems. In addition, the present application also achieves a self-diagnosis system, which can quickly find problems and report them to the outside world when problems occur. In addition, the system itself can deal with different abnormal situations, such as self-correct, downgrade the system to an inaccurate but usable state, enable backup system, etc., so as to improve the safety of the autonomous driving system, improve the work efficiency of testers, and simplify the workflow of developers.

Figure 7:
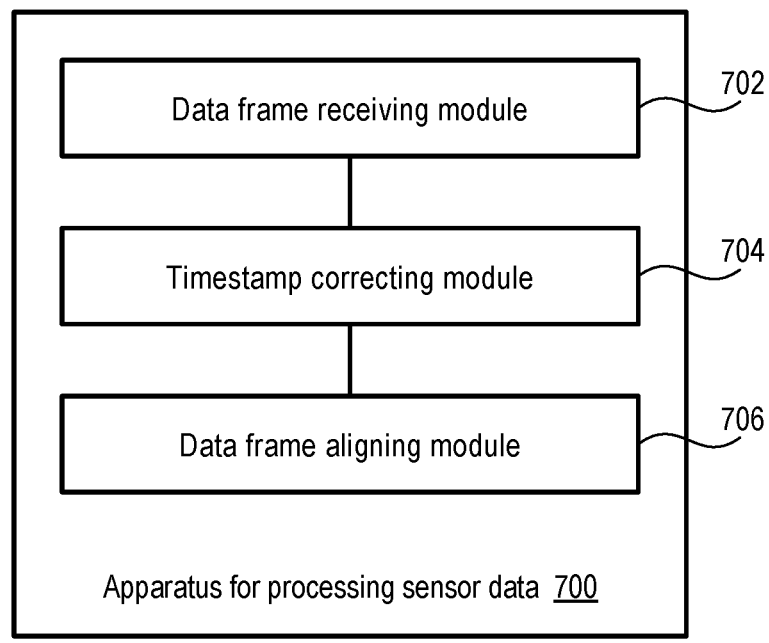
FIG. 7 is a structural diagram of an apparatus for processing sensor data according to an exemplary embodiment of the present application.

FIG. 7 is a structural diagram of an apparatus 700 for processing sensor data according to an exemplary embodiment of the present application. As shown in FIG. 7, the apparatus for processing the sensor data comprises:
- a data frame receiving module 702 configured to receive a plurality of data streams to be processed, each data stream corresponding to one sensor, and a data frame in each data stream having a generation timestamp;
- a timestamp correcting module 704 configured to correct the generation timestamp of the respective data frame to acquire a corrected timestamp; and
- a data frame aligning module 706 configured to determine, based on the corrected timestamps of the respective data frames and preset data transmission period, the data frame to be transmitted in each data transmission period from the respective data streams.

In some embodiments, the data frame receiving module 706 is configured to set a buffer queue corresponding to each data stream and store the respective data frames in the buffer queue based on the generation timestamps of the respective data frames in the respective data streams.

In some embodiments, the timestamp correcting module 704 is configured to correct the generation timestamp of the respective data frame in the data stream to a nearest integer timestamp based on a tolerance error of the respective data stream.

In some embodiments, the data frame alignment module 706 is configured to determine, for any data stream, a target timestamp corresponding to the current data transmission period in the data stream; determine, in response to a corrected timestamp of a data frame of the data stream matching the target timestamp, the data frame as a data frame to be transmitted by the data stream in the current data transmission period; and determine, in response to no data frame whose correction timestamp matching the target timestamp in the data stream, that the data stream has no data frame to be transmitted in the current data transmission period.

The data frame alignment module 706 is configured to determine an expected timestamp sequence of the data stream based on a data collection period of a sensor corresponding to the data stream; and select a target timestamp corresponding to the current data transmission period from the expected timestamp sequence. Further, the data frame alignment module 706 is configured to select at least one candidate timestamp from the expected timestamp sequence; and use a maximum value of the at least one candidate timestamp as the target timestamp.

In some embodiments, the data frame alignment module 706 is configured to calculate, for any data stream, a corrected timestamp difference between the current data frame in the data stream and a start data frame of the current predetermined period; and determine, in response to a ratio of the corrected time stamp difference to the data collection period of the data stream being a non-integer value, that the data frame is an erroneous frame of the data stream, and discard the erroneous frame.

In some embodiments, the data frame alignment module 706 is configured to calculate, for any data stream, a corrected timestamp difference between the current data frame in the data stream and a previous data frame; calculate a ratio m of the corrected time stamp difference to the data collection period of the data stream; determine, in response to m being a non-integer value, that the data frame is an erroneous frame of the data stream, and discard the erroneous frame; and judge, in response to m being an integer other than 1, that m−1 frames are lost between the current data frame and the previous data frame.

In some embodiments, the data frame alignment module 706 is configured to determine, in response to a position corresponding to the target timestamp in a data stream being determined to lose a frame(i.e., in response to determining a frame drop at the target timestamp for a data stream), that the data stream has no data frame to be transmitted in the current data transmission period; and determine, in response to no new data frame of the data stream being received within a predetermined duration from the target timestamp, that the data stream has timed out, and determine the data stream has no data to be transmitted in each data transmission period within the predetermined duration.

In some embodiments, the apparatus 700 further comprises a data frame transmission module (not shown) configured to deliver a combination of the determined data frames to be transmitted in each data transmission period to the algorithm module for calculation.

Figure 8:
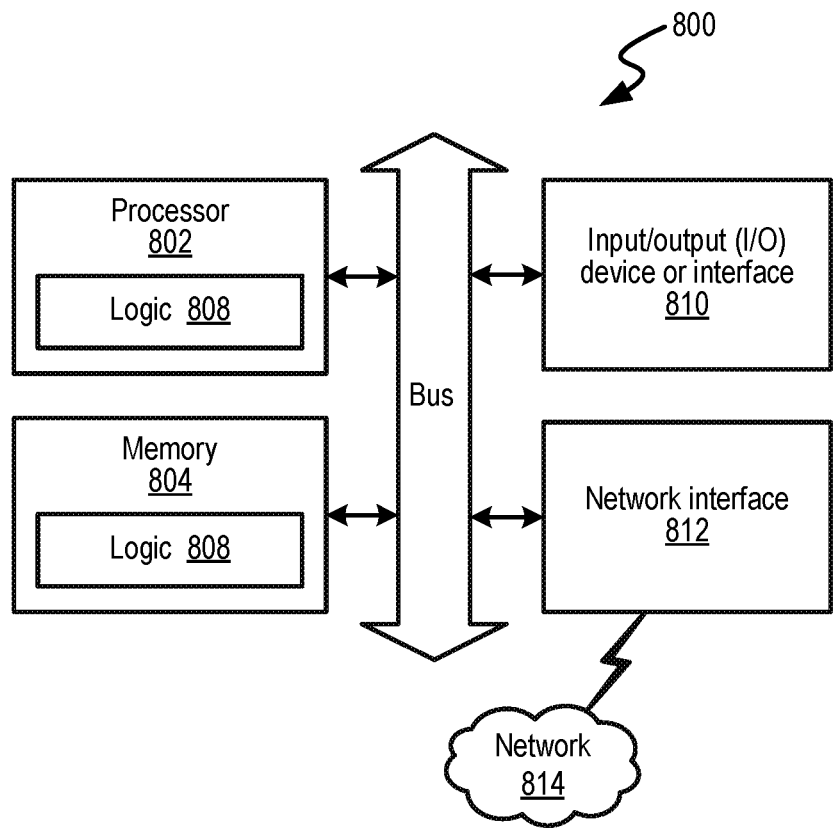
FIG. 8 is a structural diagram of a computing device according to an exemplary embodiment of the present application.

FIG. 8 shows an illustration of a machine in an example form of a computing device 800. A set of instructions within the computing device when executed and/or a processing logic when activated may cause the machine to perform any one or more of the methods described and/or claimed herein. In alternative embodiments, the machine operates as a stand-alone device, or may be connected (e.g., networked) to other machines. In a networked deployment, the machine can operate as a server or client machine in a server-client network environment, or as a peer machine in a peer-to-peer (or distributed) network environment. The machine may be a personal computer (PC), a laptop computer, a tablet computing system, a personal digital assistant (PDA), a cellular phone, a smart phone, a network application, a set-top box (STB), a network router, a switch or bridge or any machine capable of executing a set of instructions (successively or otherwise) that specifies actions to be taken by that machine or initiating a processing logic. Further, although only a single machine is illustrated, the term "machine" may also be understood to comprise any collection of machines that execute, individually or in combination, a set (or sets of instructions) of instructions to perform any one or more of the methods described and/or claimed herein.

The exemplary computing device 800 may comprise a data processor 802 (e.g., a system-on-chip (SoC), a general-purpose processing core, a graphic core, and optional other processing logic) and a memory 804 (e.g., an internal storage) that may communicate with each other via a bus 806 or other data transfer system. The computing device 800 may also comprise various input/output (I/O) devices and/or interfaces 810, such as a touch screen display, an audio jack, a voice interface, and an optional network interface 812. In an exemplary embodiment, the network interface 812 may comprise one or more radio transceivers configured to be used together with any one or more standard wireless and/or cellular protocols or access technologies (e.g., second generation (2G), 2.5 generation, third generation (3G), fourth generation (4G) and next generation radio access, global system for mobile communications (GSM), general packet radio service (GPRS), enhanced data GSM environment (EDGE), wideband code division multiple access (WCDMA), LTE, CDMA2000, WLAN, and wireless router (WR) mesh). The network interface 812 may also be configured to be used together with various other wired and/or wireless communication protocols (including TCP/IP, UDP, SIP, SMS, RTP, WAP, CDMA, TDMA, UMTS, UWB, WiFi, WiMax, Bluetooth©, IEEE802.11x, etc.). Essentially, the network interface 812 may comprise or support virtually any wired and/or wireless communication and data processing mechanism through which information/data may be propagated between the computing device 800 and another computing or communication system via a network 814.

The memory 804 may represent a machine-readable medium (or computer-readable storage medium) on which one or more sets of instructions, software, firmware or other processing logics (e.g., logic 808) that implement any one or more of the methods or functions described and/or claimed herein are stored. The logic 808, or a portion thereof, may also reside entirely or at least partially within a processor 802 during the execution by the computing device 800. In this way, the memory 804 and the processor 802 may also constitute a machine-readable medium (or a computer-readable storage medium). The logic 808, or a portion thereof, may also be configured as a processing logic or logic, at least a portion of which is partially implemented in hardware. The logic 808, or a portion thereof, may also be transmitted or received over the network 814 via the network interface 812. Although the machine-readable medium (or computer-readable storage medium) of an exemplary embodiment may be a single medium, the term "machine-readable medium" (or computer-readable storage medium) should be understood to comprise a single non-transitory medium or multiple non-transitory mediums (such as a centralized or distributed database and/or associated caching and computing systems) that store one or more sets of instructions. The term "machine-readable medium" (or computer-readable storage medium) may also be understood to comprise non-transitory medium that is capable of capable of storing, encoding, or having a set of instructions for execution by a machine and causing the machine to perform any one or more of the methods in various embodiments, or is capable of storing, encoding, or having data structures that are utilized by or associated with such a set of instructions. The term "machine-readable medium" (or computer-readable storage medium) may thus be understood to comprise, but not be limited to, a solid-state memory, an optical medium, and a magnetic medium.

The computing device determines which data frame of each data stream should be aligned to a trigger frame based on the generation timestamp/corrected timestamps of each data frame, combines the data frames in the data buffer corresponding to the determined frame ID to get a trigger frame, and then sends the trigger frame to the algorithm module.

The disclosed and other embodiments, modules, and functional operations described in this document may be implemented in digital electronic circuitry, or in computer software, firmware, or hardware (including the structures disclosed in this document and their structural equivalents), or in combinations of one or more thereof. The disclosed and other embodiments may be implemented as one or more computer program products, that is, one or more modules of computer program instructions, which are encoded on the computer-readable medium for execution by a data processing apparatus or to control the operation of the data processing apparatus. The computer-readable medium may be a machine-readable storage device, a machine-readable storage substrate, a memory device, a composition of matter that affects a machine-readable propagated signal, or a combination of one or more thereof. The term "data processing apparatus" encompasses all apparatus, devices and machines for processing data, including, for example, a programmable processor, a computer, or a plurality of processors or computers. In addition to hardware, the apparatus may comprise codes that create an execution environment for the computer program in question, such as codes constituting processor firmware, a protocol stack, a database management system, an operating system, or a combination of one or more thereof. A propagated signal is an artificially generated signal, such as a machine-generated electrical, optical or electromagnetic signal, which is generated to encode information for transmission to a suitable receiver apparatus.

A computer program (also referred to as a program, software, software application, script, or code) may be written in any form of programming language, including compiled or interpreted languages; and the computer program may be deployed in any form, including as a stand-alone program or as a module, component, subroutine, or another unit suitable for use in a computing environment. The computer program does not necessarily correspond to files in a file system. The program may be stored in a portion of a file that holds other programs or data (such as one or more scripts stored in a markup language document), or in a single file dedicated to the program in question, or in a plurality of collaborative files (such as files that store one or more modules, subroutines, or portions of codes). The computer program may be deployed to be executed on one computer or on a plurality of computers that is located at one site or distributed among a plurality of sites and interconnected by a communication network.

The processes and logic flows described in this document can be performed by one or more programmable processors that execute one or more computer programs to perform functions by operating on input data and generating output. The processes and logic flows may also be performed by special purpose logic circuitry (e.g., a field programmable gate array (FPGA)) or an application specific integrated circuit (ASIC); and the apparatus may also be implemented as special purpose logic circuitry special purpose logic circuitry (e.g., a field programmable gate array (FPGA)) or an application specific integrated circuit (ASIC).

Processors suitable for the execution of a computer program comprise, by way of example, both general and special purpose microprocessors, and any one or more processors of any kind of digital computer. Typically, a processor will receive instructions and data from a read-only memory or a random access memory or both. The essential elements of a computer comprise a processor for executing instructions and one or more memory devices for storing instructions and data. Typically, a computer will also comprise one or more mass storage devices (such as a magnetic disk, a magneto-optical disk, or an optical disk) for storing data, or the computer is also operatively coupled to receive data from or transfer data to the one or more mass storage devices or both. However, a computer need not comprise such a device. Computer-readable media suitable for storage of computer program instructions and data comprise all forms of non-volatile memory, media, and memory devices, including, for example, semiconductor memory devices, such as EPROM, EEPROM, and flash memory devices; magnetic disks, such as internal hard disks or removable disks; magneto-optical disks; and CD-ROM and DVD-ROM disks. The processor and memory may be supplemented by or incorporated in special purpose logic circuitry.

Although the present application contains many details, these should not be construed as limitations on the scope of any invention or what may be claimed, but as descriptions of features that may be directed to particular embodiments of particular inventions. Certain features that are described in the context of separate embodiments of the present application may also be implemented in combination in a single embodiment. Conversely, various features described in the context of a single embodiment may also be implemented in multiple embodiments individually or in any suitable sub-combination. Furthermore, although features may be described above as functioning in certain combinations and originally even claimed as such, in some cases one or more features from the claimed combination may be deleted from the combinations, and the required combination can be directed to a sub-combination or a variation of the sub-combination.

Similarly, although operations are depicted in the accompanying drawings in a particular order, this should not be construed such that such operations need to be performed in the particular order shown, or in a sequential order, or all illustrated operations need to be performed to achieve desirable results. Furthermore, the separation of various system components in the embodiments described in the present application should not be construed as requiring such separation in all embodiments.

Only some implementations and examples have been described, and other implementations, enhancements and variations can be made based on the content described and illustrated in the present application.

The descriptions of the embodiments described herein are intended to provide a general understanding of the structures of the various embodiments. Many other embodiments will be apparent to those of ordinary skill in the art upon review of the description provided herein. Other embodiments may be utilized and derived, such that structural and logical substitutions and changes may be made without departing from the scope of the present application. The drawings herein are representative only and may not be drawn to scale. Certain proportions may be increased, while other proportions may be minimized. Therefore, the descriptions and drawings should be considered as illustrative but not restrictive.

Some embodiments implement functions in two or more specific interconnected hardware modules or devices, with related control and data signals being communicated between and through the modules, or as part of an application specific integrated circuit. Thus, the example system is suitable for software, firmware and hardware implementations.

While exemplary embodiments or examples of the present application have been described with reference to the accompanying drawings, it should be understood that the exemplary discussions above are not intended to be exhaustive or to limit the invention to the specific forms disclosed. Many modifications and variations are possible in light of the above teachings. Therefore, the disclosed subject matter should not be limited to any single embodiment or example described herein, but should be construed in breadth and scope in accordance with the appended claims.

We claim:

1. A method for processing data streams, comprising:
   receiving a plurality of data streams to be processed, each of the plurality of the data streams corresponding to a sensor, each of the plurality of the data streams comprising a plurality of data frames, and each of the plurality of data frames having a generation timestamp;
   for each of the plurality of the data streams:
     correcting the generation timestamps of the plurality of data frames of the data stream to an integer multiple of a tolerable error of the data stream, to acquire corrected timestamps; and
     determining from the plurality of data frames of the data stream, based on the corrected timestamps of the plurality of data frames, a data frame to be transmitted in a data transmission period;
   wherein determining the data frame to be transmitted in the data transmission period comprises:
     determining a target timestamp corresponding to a data transmission period; and
     determining from the plurality of data frames of the data stream, a data frame whose corrected timestamp matching the target timestamp, as a to-be-transmitted data frame for the data stream in the data transmission period.

2. The method according to claim 1, wherein the plurality of data streams comprise at least one of an original data stream collected by a plurality of sensors and a post-processing data stream acquired by processing the original data stream; and wherein the post-processing data stream has a generation timestamp of the original data stream.

3. The method according to claim 1, further comprising:
   for each of the plurality of the data streams:
     setting a buffer queue corresponding to the data stream; and
     storing, based on the generation timestamps of the plurality of data frames, the plurality of data frames in the buffer queue.

4. The method according to claim 1, wherein correcting the generation timestamp of the data frame comprises:
   correcting the generation timestamp of each of the data frames in the data stream to a nearest integer multiple of the tolerable error of the data stream;
   wherein each of the plurality of the data streams has a data collection period; and
   the tolerable error of the data stream is evenly divisible by the data collection period of the data stream and is less than half of the data collection period.

5. The method according to claim 1, wherein determining the data frame to be transmitted in the data transmission period comprises:
  determining, in response to the data stream having no data frame whose correction timestamp matching the target timestamp, that the data stream has no to-be-transmitted data frame in the data transmission period.

6. The method according to claim 1, wherein each of the plurality of the data streams has a data collection period, and determining the target timestamp corresponding to the data transmission period comprises:
  determining an expected timestamp sequence of the data stream based on a data collection period of the sensor corresponding to the data stream, wherein the expected timestamp sequence comprises a plurality of timestamps; and
  selecting, from the expected timestamp sequence, the target timestamp corresponding to the data transmission period.

7. The method according to claim 6, wherein selecting the target timestamp corresponding to the data transmission period comprises:
  selecting at least one candidate timestamp from the expected timestamp sequence, wherein the candidate timestamp is not later than an end moment of the data transmission period; and
  using a maximum value of the at least one candidate timestamp as the target timestamp.

8. The method according to claim 1, wherein the sensor is a plurality of sensors, and the plurality of sensors generate the plurality of data frames once at a same time at a predetermined period; and wherein determining the data frame to be transmitted in the data transmission period comprises:
  for each data frame of the plurality of data frames of the data stream:
    calculating a difference between the corrected timestamp of the data frame and the corrected timestamp of a first data frame of the predetermined period; and
    determining, in response to a ratio of the difference to a data collection period of the data stream being a non-integer value, that the data frame is an erroneous frame of the data stream; and
    discarding the erroneous frame.

9. The method according to claim 1, wherein determining the data frame to be transmitted in the data transmission period comprises:
  for each data frame of the plurality of the data frames of the data stream:
    calculating a difference between the corrected timestamp of the data frame and the corrected timestamp of a previous data frame of the data frame;
    calculating a ratio m of the difference to a data collection period of the data stream;
    determining, in response to the ratio m being a non-integer value, that the data frame is an erroneous frame of the data stream, and discarding the erroneous frame; and
    determining, in response to the ratio m being an integer other than 1, that m−1 frames are lost between the data frame and the previous data frame.

10. The method according to claim 1, wherein determining the data frame to be transmitted in each data transmission period for comprises:
  determining, in response to determining that the data stream has lost data frame at the target timestamp, that the data stream has no data frame to be transmitted in the data transmission period; and
  determining, in response to no new data frame of the data stream being received within a predetermined period from the target timestamp, that the data stream has timed out and that the data stream has no data frame to be transmitted in the data transmission period.

11. The method according to claim 1, further comprising:
  delivering a set of the determined data frames to be transmitted in the data transmission period to an algorithm module for calculation.

12. The method according to claim 1, further comprising:
  delivering, in response to all data streams at the target timestamp having a marked state, a set of the determined data frames to-be-transmitted in the data transmission period to an algorithm module.

13. The method according to claim 12, wherein the marked state comprises at least one of:
  a state represents the data stream has a to-be-transmitted data frame at the target timestamp;
  a state represents the data stream has timed out at the target timestamp; or
  a state represents the data stream lost a data frame at the target timestamp.

14. A computing device, comprising:
  one or more processors; and
  a memory configured to store one or more programs therein, wherein the one or more programs, when performed by the one or more processors, causes the one or more processors to implement a method comprising:
  receiving a plurality of data streams to be processed, each of the plurality of the data streams corresponding to a sensor, each of the plurality of the data streams comprising a plurality of data frames, and each of the plurality of data frames having a generation timestamp;
  for each of the plurality of the data streams:
    correcting the generation timestamps of the plurality of data frames of the data stream to an integer multiple of a tolerable error of the data stream, to acquire corrected timestamps; and
    determining from the plurality of data frames of the data stream, based on the corrected timestamps of the plurality of data frames, a data frame to be transmitted in a data transmission period;
  wherein determining the data frame to be transmitted in the data transmission period comprises:
    determining a target timestamp corresponding to a data transmission period; and
    determining from the plurality of data frames of the data stream, a data frame whose corrected timestamp matching the target timestamp, as a to-be-transmitted data frame for the data stream in the data transmission period.

15. The computing device according to claim 14, wherein the method further comprises:
  for each of the plurality of the data streams:
    setting a buffer queue corresponding to the data stream; and
    storing, based on the generation timestamps of the plurality of data frames, the plurality of data frames in the buffer queue.

16. The computing device according to claim 14, wherein correcting the generation timestamp of the data frame comprises:

correcting the generation timestamp of each of the data frame in the data stream to a nearest integer multiple of the tolerable error of the data stream, wherein each of the plurality of the data streams has a data collection period; and the tolerable error of the data stream is evenly divisible by a factor of the data collection period of the data stream and is less than half of the data collection period.

17. The computing device according to claim 14, wherein determining the data frame to be transmitted in the data transmission period comprises:

determining, in response to the data stream having no data frame whose correction timestamp matching the target timestamp, that the data stream has no to-be-transmitted data frame in the data transmission period.

18. The computing device according to claim 17, wherein each of the plurality of the data streams has a data collection period, and determining the target timestamp corresponding to a current data transmission period comprises:

determining an expected timestamp sequence of the data stream based on the data collection period of the sensor corresponding to the data stream, wherein the expected timestamp sequence comprises a plurality of timestamps; and selecting, from the expected timestamp sequence, the target timestamp corresponding to the data transmission period.

19. A non-transitory computer-readable storage medium configured to store instructions therein, wherein the instructions, when executed by a processor, cause implementation of a method comprising:

receiving a plurality of data streams to be processed, each of the plurality of the data streams corresponding to a sensor, each of the plurality of the data streams comprising a plurality of data frames, and each of the plurality of data frames having a generation timestamp;

for each of the plurality of the data streams:

correcting the generation timestamps of the plurality of data frames of the data stream to an integer multiple of a tolerable error of the data stream, to acquire corrected timestamps; and determining from the plurality of data frames of the data stream, based on the corrected timestamps of the plurality of data frames, a data frame to be transmitted in a data transmission period;

wherein determining the data frame to be transmitted in the data transmission period comprises:

determining a target timestamp corresponding to a data transmission period; and determining from the plurality of data frames of the data stream, a data frame whose corrected timestamp matching the target timestamp, as a to-be-transmitted data frame for the data stream in the data transmission period.

20. The non-transitory computer-readable storage medium according to claim 19, wherein determining the data frame to be transmitted in the data transmission period comprises:

determining, in response to the data stream having no data frame whose correction timestamp matching the target timestamp, that the data stream has no to-be-transmitted data frame in the data transmission period.

* * * * *